(12) United States Patent
Hoppe et al.

(10) Patent No.: US 12,509,278 B2
(45) Date of Patent: Dec. 30, 2025

(54) TOOL STORAGE

(71) Applicant: Milwaukee Electric Tool Corporation, Brookfield, WI (US)

(72) Inventors: Christopher S. Hoppe, Midvale, UT (US); Michael John Caelwaerts, Milwaukee, WI (US); Samuel A. Gould, New Berlin, WI (US); Aaron M. Williams, Milwaukee, WI (US); Aaron S. Blumenthal, Shorewood, WI (US); Michael Stearns, Milwaukee, WI (US); Grant T. Squiers, Cudahy, WI (US); Steven W. Hyma, Milwaukee, WI (US); Jason D. Thurner, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/229,677

(22) Filed: Jun. 5, 2025

(65) Prior Publication Data

US 2025/0296735 A1 Sep. 25, 2025

Related U.S. Application Data

(63) Continuation of application No. 19/095,623, filed on Mar. 31, 2025, which is a continuation of application
(Continued)

(51) Int. Cl.
*B65D 21/02* (2006.01)
*B25H 3/02* (2006.01)

(52) U.S. Cl.
CPC ......... *B65D 21/0204* (2013.01); *B25H 3/021* (2013.01); *B25H 3/022* (2013.01);
(Continued)

(58) Field of Classification Search
CPC ........... B65D 21/0212; B65D 21/0215; B65D 21/0216; B65D 21/0217; B65D 21/0219;
(Continued)

(56) References Cited

U.S. PATENT DOCUMENTS

| 1,112,943 A | 10/1914 | Stone |
| 1,488,460 A | 3/1924 | Scheer |

(Continued)

FOREIGN PATENT DOCUMENTS

| CN | 2608238 | 3/2004 |
| CN | 2782508 | 5/2006 |

(Continued)

OTHER PUBLICATIONS

International Search Report and Written Opinion for International Application No. PCT/US2018/033161, dated Aug. 6, 2018.
(Continued)

*Primary Examiner* — Don M Anderson
(74) *Attorney, Agent, or Firm* — Reinhart Boerner Van Deuren s.c.

(57) ABSTRACT

Described herein are various coupling systems to be used with storage units that are selectively coupled and decoupled. The coupling systems may be used with storage units that are stackable and/or transportable, thus allowing the storage units to function well within a large stationary environment, such as a basement, and also for a subset of the storage units to be selected and easily moved to another location.

15 Claims, 34 Drawing Sheets

Related U.S. Application Data

No. 17/736,749, filed on May 4, 2022, now Pat. No. 12,286,267, which is a continuation of application No. 16/280,432, filed on Feb. 20, 2019, now Pat. No. 11,338,959, which is a continuation of application No. PCT/US2019/014940, filed on Jan. 24, 2019.

(60) Provisional application No. 62/621,403, filed on Jan. 24, 2018.

(52) U.S. Cl.
CPC ............. *B25H 3/023* (2013.01); *B25H 3/027* (2013.01); *B65D 21/0212* (2013.01); *B65D 21/0215* (2013.01); *B65D 21/0216* (2013.01); *B65D 21/0223* (2013.01)

(58) Field of Classification Search
CPC ............ B65D 21/0222; B65D 21/0223; B65D 21/0204; B25H 3/021; B25H 3/022; B25H 3/023; B25H 3/027
See application file for complete search history.

(56) References Cited

U.S. PATENT DOCUMENTS

| | | | |
|---|---|---|---|
| 2,042,387 A | 5/1936 | Cobb |
| 2,103,106 A | 12/1937 | Yurkovitch |
| 2,210,235 A | 8/1940 | Filbert |
| 2,386,343 A | 10/1945 | Regenhardt |
| 2,430,200 A | 11/1947 | Wilson |
| 2,558,126 A | 6/1951 | Davenport |
| 2,588,009 A | 3/1952 | Jones |
| 2,970,358 A | 2/1961 | Elsner |
| 3,117,692 A | 1/1964 | Carpenter et al. |
| 3,186,585 A | 6/1965 | Denny |
| 3,225,865 A | 12/1965 | Downey |
| 3,424,334 A | 1/1969 | Goltz |
| 3,506,321 A | 4/1970 | Hampel |
| 3,550,908 A | 12/1970 | Propst et al. |
| 3,552,817 A | 1/1971 | Marcolongo |
| 3,567,298 A | 3/1971 | Ambaum et al. |
| 3,778,175 A | 12/1973 | Zimmer |
| D232,798 S | 9/1974 | Roche et al. |
| 3,851,936 A | 12/1974 | Muller |
| 3,913,741 A | 10/1975 | Pirie |
| 3,974,898 A | 8/1976 | Tullis et al. |
| 3,999,818 A | 12/1976 | Schankler |
| 4,126,366 A | 11/1978 | Handler |
| 4,168,076 A | 9/1979 | Johnson |
| 4,338,987 A | 7/1982 | Miles |
| 4,457,436 A | 7/1984 | Kelley |
| 4,467,925 A | 8/1984 | Ratzloff |
| 4,491,231 A | 1/1985 | Heggeland et al. |
| 4,524,985 A | 6/1985 | Drake |
| 4,531,645 A | 7/1985 | Tisbo |
| 4,535,897 A | 8/1985 | Remington |
| 4,564,732 A | 1/1986 | Lancaster et al. |
| 4,577,772 A | 3/1986 | Bigliardi |
| D285,986 S | 10/1986 | Huang |
| 4,639,005 A | 1/1987 | Birkley |
| 4,643,494 A | 2/1987 | Marleau |
| 4,660,725 A | 4/1987 | Fishman et al. |
| 4,673,070 A | 6/1987 | Ambal |
| 4,684,034 A | 8/1987 | Ono et al. |
| 4,693,345 A | 9/1987 | Mittelmann |
| 4,735,107 A | 4/1988 | Winkie |
| 4,775,282 A | 10/1988 | Van Vliet |
| 4,880,248 A | 11/1989 | Elmer |
| 4,971,201 A | 11/1990 | Sathre |
| 5,035,389 A | 7/1991 | Wang |
| 5,035,445 A | 7/1991 | Poulin |
| D319,016 S | 8/1991 | Kahl |
| 5,098,235 A | 3/1992 | Svetlik et al. |
| D325,324 S | 4/1992 | Kahl |
| 5,105,947 A | 4/1992 | Wise |
| D326,815 S | 6/1992 | Meisner et al. |
| 5,154,291 A | 10/1992 | Sur |
| 5,219,446 A | 6/1993 | Klepac |
| 5,240,264 A | 8/1993 | Williams |
| D340,167 S | 10/1993 | Kahl |
| 5,263,576 A | 11/1993 | Boreen |
| 5,301,829 A | 4/1994 | Chrisco |
| D352,208 S | 11/1994 | Brookshire |
| 5,386,959 A | 2/1995 | Laughlin |
| 5,407,170 A | 4/1995 | Slivon |
| 5,429,260 A | 7/1995 | Vollers |
| D361,511 S | 8/1995 | Dickinson et al. |
| 5,437,502 A | 8/1995 | Warnick |
| 5,454,634 A | 10/1995 | Herbst et al. |
| 5,538,213 A | 7/1996 | Brown |
| 5,595,228 A | 1/1997 | Meisner et al. |
| 5,608,603 A | 3/1997 | Su |
| 5,628,443 A | 5/1997 | Deutsch |
| 5,664,292 A | 9/1997 | Chen |
| 5,676,292 A | 10/1997 | Miller |
| D395,533 S | 6/1998 | Morison et al. |
| 5,797,617 A | 8/1998 | Lin |
| 5,890,613 A | 4/1999 | Williams |
| 5,906,381 A | 5/1999 | Hovatter |
| 5,951,037 A | 9/1999 | Hsieh |
| D415,393 S | 10/1999 | Kei |
| 5,988,473 A | 11/1999 | Hagan et al. |
| 5,996,869 A | 12/1999 | Belinky |
| 6,006,973 A | 12/1999 | Belinky |
| D420,860 S | 2/2000 | Golichowski et al. |
| 6,036,071 A | 3/2000 | Hartmann et al. |
| 6,050,660 A | 4/2000 | Gurley |
| 6,059,135 A | 5/2000 | James |
| 6,085,925 A | 7/2000 | Chung |
| 6,099,035 A | 8/2000 | Garvin, III |
| 6,109,627 A | 8/2000 | Be |
| 6,123,344 A | 9/2000 | Clegg |
| 6,131,926 A | 10/2000 | Harlan |
| 6,176,558 B1 | 1/2001 | Hlade et al. |
| 6,176,559 B1 | 1/2001 | Tiramani et al. |
| D437,484 S | 2/2001 | Tiramani et al. |
| D437,669 S | 2/2001 | Blason et al. |
| 6,202,909 B1 | 3/2001 | Belinky |
| 6,253,981 B1 | 7/2001 | McLemore |
| 6,305,498 B1 | 10/2001 | Itzkovitch |
| 6,311,881 B1 | 11/2001 | Kamiya |
| 6,347,847 B1 | 2/2002 | Tiramani et al. |
| 6,354,759 B1 | 3/2002 | Leicht |
| 6,367,631 B1 | 4/2002 | Steigerwald |
| 6,371,320 B2 | 4/2002 | Sagol |
| 6,371,321 B1 | 4/2002 | Lee |
| D456,972 S | 5/2002 | Blason et al. |
| 6,382,486 B1 | 5/2002 | Kretchman |
| 6,390,343 B1 | 5/2002 | Jain |
| 6,431,580 B1 | 8/2002 | Kady |
| 6,435,357 B1 | 8/2002 | Lee |
| 6,497,395 B1 | 12/2002 | Croker |
| 6,547,347 B2 | 4/2003 | Saito |
| 6,601,930 B2 | 8/2003 | Tiramani et al. |
| 6,619,772 B2 | 9/2003 | Dierbeck |
| 6,637,707 B1 | 10/2003 | Gates |
| 6,641,013 B2 | 11/2003 | Oise |
| 6,729,827 B1 | 5/2004 | Williams |
| 6,945,546 B2 | 9/2005 | Guirlinger |
| 6,948,691 B2 | 9/2005 | Brock et al. |
| 6,983,946 B2 | 1/2006 | Sullivan et al. |
| 7,007,903 B2 | 3/2006 | Turner |
| 7,044,484 B2 | 5/2006 | Wang |
| 7,066,475 B2 | 6/2006 | Barnes |
| D525,789 S | 8/2006 | Hosking |
| D527,225 S | 8/2006 | Krieger et al. |
| 7,083,061 B2 | 8/2006 | Spindel et al. |
| 7,121,417 B2 | 10/2006 | Magnusson et al. |
| 7,147,243 B2 | 12/2006 | Kady |
| 7,152,752 B2 | 12/2006 | Kurtenbach |
| D536,580 S | 2/2007 | Krieger et al. |
| 7,263,742 B2 | 9/2007 | Valentini |
| 7,350,648 B2 | 4/2008 | Gerstner et al. |

(56) References Cited

U.S. PATENT DOCUMENTS

| | | |
|---|---|---|
| 7,367,571 B1 | 5/2008 | Nichols |
| 7,431,313 B1 | 10/2008 | Torres |
| 7,448,115 B2 | 11/2008 | Howell et al. |
| 7,490,800 B2 | 2/2009 | Tu |
| 7,503,569 B2 | 3/2009 | Duvigneau |
| 7,658,887 B2 | 2/2010 | Hovatter |
| 7,690,856 B2 | 4/2010 | Mortensen |
| 7,757,913 B2 | 7/2010 | Fichera |
| 7,779,764 B2 | 8/2010 | Naidu et al. |
| 7,780,026 B1 | 8/2010 | Zuckerman |
| 7,841,144 B2 | 11/2010 | Pervan |
| 7,845,501 B1 | 12/2010 | Fosburg |
| D630,851 S | 1/2011 | Landau et al. |
| D632,043 S | 2/2011 | Rouillard |
| 8,028,845 B2 | 10/2011 | Himes |
| D649,350 S | 11/2011 | Shitrit |
| D649,783 S | 12/2011 | Brunner |
| D653,832 S | 2/2012 | Vilkomirski et al. |
| 8,132,819 B2 | 3/2012 | Landau |
| 8,177,463 B2 | 5/2012 | Walker |
| D661,858 S | 6/2012 | Lifshitz et al. |
| 8,191,910 B2 | 6/2012 | Landau et al. |
| D663,952 S | 7/2012 | Crevling et al. |
| D664,354 S | 7/2012 | Crevling et al. |
| D668,869 S | 10/2012 | Yamamoto et al. |
| D674,605 S | 1/2013 | Vilkomirski et al. |
| 8,453,796 B2 | 6/2013 | Astor |
| 8,454,033 B2 | 6/2013 | Tsai |
| 8,459,495 B2 | 6/2013 | Koenig |
| 8,505,729 B2 | 8/2013 | Sosnovsky et al. |
| 8,567,796 B2 | 10/2013 | Bar-Erez et al. |
| 8,677,661 B2 | 3/2014 | Michels |
| D701,696 S | 4/2014 | Shitrit et al. |
| 8,689,396 B2 | 4/2014 | Wolfe |
| 8,714,355 B2 | 5/2014 | Huang |
| 8,740,010 B1 | 6/2014 | Page |
| 8,813,960 B2 | 8/2014 | Fjelland |
| 8,875,888 B2 | 11/2014 | Koenig |
| 8,894,160 B1 | 11/2014 | Christensen |
| 8,967,379 B2 | 3/2015 | Kinskey |
| 8,979,100 B2 | 3/2015 | Bensman et al. |
| 8,985,418 B1 | 3/2015 | Poudrier |
| 8,985,922 B2 | 3/2015 | Neumann |
| D738,105 S | 9/2015 | Shitrit |
| D738,106 S | 9/2015 | Shitrit |
| 9,126,329 B2 | 9/2015 | Kao |
| 9,132,543 B2 | 9/2015 | Bar-Erez |
| 9,216,751 B2 | 12/2015 | Adams |
| 9,254,856 B2 | 2/2016 | Oachs |
| D753,394 S | 4/2016 | Brunner |
| D753,395 S | 4/2016 | Brunner |
| D753,396 S | 4/2016 | Brunner |
| 9,375,835 B1 | 6/2016 | Lin |
| D765,974 S | 9/2016 | Tonelli et al. |
| D770,179 S | 11/2016 | Menirom |
| 9,506,489 B2 | 11/2016 | Ko |
| 9,511,491 B2 | 12/2016 | Brunner |
| D777,426 S | 1/2017 | Dahl |
| 9,566,990 B2 | 2/2017 | Bar-Erez |
| D784,089 S | 4/2017 | Furneaux et al. |
| 9,616,562 B2 | 4/2017 | Hoppe |
| 9,643,629 B2 | 5/2017 | Bar-Erez et al. |
| D790,221 S | 6/2017 | Yahav et al. |
| 9,694,758 B1 | 7/2017 | Krolski |
| 9,701,443 B2 | 7/2017 | Wang |
| 9,725,209 B1 | 8/2017 | Ben-Gigi |
| D803,631 S | 11/2017 | Min et al. |
| D806,483 S | 1/2018 | Stanford et al. |
| 9,872,562 B2 | 1/2018 | Brunner |
| D814,187 S | 4/2018 | Caglar |
| D815,434 S | 4/2018 | Bowen |
| D815,831 S | 4/2018 | Tonelli |
| D816,334 S | 5/2018 | Brunner |
| 10,017,134 B2 | 7/2018 | Pickens et al. |
| D826,510 S | 8/2018 | Brunner |
| RE47,022 E | 9/2018 | Sosnovsky et al. |
| D828,671 S | 9/2018 | Cope et al. |
| D831,352 S | 10/2018 | Brunner |
| 10,106,180 B2 | 10/2018 | Bar-Erez et al. |
| D833,744 S | 11/2018 | Yahav et al. |
| D836,995 S | 1/2019 | Carey et al. |
| D837,515 S | 1/2019 | Shpitzer |
| D839,681 S | 2/2019 | Evron et al. |
| D845,080 S | 4/2019 | Jacobsen |
| D845,081 S | 4/2019 | Jacobsen |
| 10,246,116 B2 | 4/2019 | Oltman |
| D857,387 S | 8/2019 | Shpitzer |
| 10,406,387 B2 | 9/2019 | Krepel et al. |
| 10,434,638 B1 | 10/2019 | Tsai |
| 10,434,639 B1 | 10/2019 | Chen |
| 10,479,284 B1 | 11/2019 | Salyer |
| D871,013 S | 12/2019 | Liu |
| D873,085 S | 1/2020 | DeFrancia |
| D876,833 S | 3/2020 | Brunner et al. |
| 10,583,962 B2 | 3/2020 | Brunner et al. |
| 10,593,962 B2 | 3/2020 | Herchen et al. |
| D880,252 S | 4/2020 | Jacobsen |
| D880,951 S | 4/2020 | Jacobsen |
| D883,752 S | 5/2020 | Carey et al. |
| D887,788 S | 6/2020 | Meda et al. |
| D888,422 S | 6/2020 | Yang |
| D888,503 S | 6/2020 | Meda et al. |
| D891,193 S | 7/2020 | Stanford et al. |
| D891,195 S | 7/2020 | Zhou |
| D891,875 S | 8/2020 | Olson |
| D892,565 S | 8/2020 | Astle et al. |
| 10,750,833 B2 * | 8/2020 | Burchia .......... B65D 21/0223 |
| D895,375 S | 9/2020 | Hurley, Jr. |
| D895,966 S | 9/2020 | Brunner et al. |
| D895,967 S | 9/2020 | Brunner et al. |
| D896,517 S | 9/2020 | Brunner et al. |
| D896,518 S | 9/2020 | Brunner et al. |
| D898,320 S | 10/2020 | Brunner et al. |
| 10,793,172 B2 | 10/2020 | Brunner |
| 10,829,268 B2 | 11/2020 | Sommer |
| D917,977 S | 5/2021 | Brunner et al. |
| D918,584 S | 5/2021 | Brunner et al. |
| D919,296 S | 5/2021 | Brunner et al. |
| 11,008,136 B2 | 5/2021 | Brunner et al. |
| D920,671 S | 6/2021 | Brunner et al. |
| 11,066,089 B2 | 7/2021 | Brunner |
| D932,186 S | 10/2021 | Brunner et al. |
| 11,155,382 B1 | 10/2021 | Cai |
| D936,030 S | 11/2021 | Lee et al. |
| D941,020 S | 1/2022 | Brunner et al. |
| 11,230,410 B2 | 1/2022 | Brunner |
| 11,283,117 B2 | 3/2022 | Polakowski et al. |
| 11,338,959 B2 | 5/2022 | Hoppe |
| 11,426,859 B2 | 8/2022 | Squiers |
| 11,486,547 B1 | 11/2022 | Charles |
| 11,529,985 B2 | 12/2022 | Brunner |
| 11,554,898 B2 | 1/2023 | Brunner |
| 11,612,998 B1 | 3/2023 | Byington |
| 11,638,992 B2 | 5/2023 | Jessop |
| 11,667,029 B1 | 6/2023 | Hsieh |
| 11,673,510 B1 | 6/2023 | Nguyen |
| 11,840,269 B2 | 12/2023 | Brunner |
| 11,964,632 B2 | 4/2024 | Rutman |
| 12,043,216 B1 | 7/2024 | Nickel |
| 12,187,491 B2 | 1/2025 | Squiers |
| 12,195,229 B2 | 1/2025 | Hoppe |
| 12,286,267 B2 | 4/2025 | Hoppe |
| 2002/0000440 A1 | 1/2002 | Sagal et al. |
| 2002/0020729 A1 | 2/2002 | Alter |
| 2002/0030425 A1 | 3/2002 | Tiramani et al. |
| 2002/0122691 A1 | 9/2002 | Wood |
| 2002/0125072 A1 | 9/2002 | Levy |
| 2002/0171228 A1 | 11/2002 | Kady |
| 2003/0075468 A1 | 4/2003 | Story et al. |
| 2003/0080263 A1 | 5/2003 | McCoy |
| 2003/0094393 A1 | 5/2003 | Sahm, III |
| 2003/0115715 A1 | 6/2003 | Valentini |
| 2003/0139080 A1 | 7/2003 | Lafragette et al. |
| 2003/0146589 A1 | 8/2003 | Jarko et al. |

(56) References Cited

U.S. PATENT DOCUMENTS

| | | |
|---|---|---|
| 2003/0184034 A1 | 10/2003 | Pfeiffer |
| 2003/0205877 A1 | 11/2003 | Verna et al. |
| 2004/0051290 A1 | 3/2004 | Morgan |
| 2004/0074725 A1 | 4/2004 | Shih |
| 2004/0103494 A1 | 6/2004 | Valentini |
| 2004/0134818 A1 | 7/2004 | Cunningham |
| 2004/0149754 A1 | 8/2004 | Diamant |
| 2004/0195793 A1 | 10/2004 | Sullivan et al. |
| 2004/0206656 A1 | 10/2004 | Dubois et al. |
| 2004/0256529 A1 | 12/2004 | Richter |
| 2005/0035167 A1 | 2/2005 | Threet |
| 2005/0062244 A1 | 3/2005 | Guirlinger |
| 2005/0082775 A1 | 4/2005 | Slager |
| 2005/0104308 A1 | 5/2005 | Barnes |
| 2005/0139745 A1 | 6/2005 | Liao |
| 2005/0242141 A1 | 11/2005 | Zhang |
| 2005/0274759 A1 | 12/2005 | Kircher |
| 2005/0280228 A1 | 12/2005 | Fernandes |
| 2006/0006770 A1 | 1/2006 | Valentini |
| 2006/0027475 A1 | 2/2006 | Gleason et al. |
| 2006/0038367 A9 | 2/2006 | Ferraro |
| 2006/0113303 A1 | 6/2006 | Huruta |
| 2006/0119060 A1 | 6/2006 | Sullivan et al. |
| 2006/0151556 A1 | 7/2006 | Eby |
| 2006/0165482 A1 | 7/2006 | Olberding |
| 2006/0186624 A1 | 8/2006 | Kady |
| 2006/0254946 A1 | 11/2006 | Becklin |
| 2007/0006542 A1 | 1/2007 | Duke |
| 2007/0012694 A1 | 1/2007 | Duvigneau |
| 2007/0045505 A1 | 3/2007 | Chen |
| 2007/0068757 A1 | 3/2007 | Tan |
| 2007/0090616 A1 | 4/2007 | Tompkins |
| 2007/0138041 A1 | 6/2007 | Welsh |
| 2007/0145700 A1 | 6/2007 | Ambrose et al. |
| 2007/0175938 A1 | 8/2007 | Swenson |
| 2007/0194543 A1 | 8/2007 | Duvingneau |
| 2007/0200309 A1 | 8/2007 | Coppedge |
| 2007/0256996 A1 | 11/2007 | Jackle |
| 2007/0273114 A1 | 11/2007 | Katz |
| 2008/0011698 A1 | 1/2008 | Simon |
| 2008/0104921 A1 | 5/2008 | Pervan |
| 2008/0115312 A1 | 5/2008 | Dipasquale et al. |
| 2008/0121547 A1 | 5/2008 | Dur et al. |
| 2008/0134607 A1 | 6/2008 | Pervan |
| 2008/0169739 A1 | 7/2008 | Goldenberg |
| 2008/0271280 A1 | 11/2008 | Frank et al. |
| 2008/0277221 A1 | 11/2008 | Josefson |
| 2008/0280523 A1 | 11/2008 | Bishop |
| 2008/0308369 A1 | 12/2008 | Louis |
| 2009/0026901 A1 | 1/2009 | Nies, III et al. |
| 2009/0056592 A1 | 3/2009 | Threet |
| 2009/0071990 A1 | 3/2009 | Jardine et al. |
| 2009/0120947 A1 | 5/2009 | Davis |
| 2009/0127146 A1 | 5/2009 | Krebs |
| 2009/0140024 A1 | 6/2009 | McLemore |
| 2009/0145790 A1 | 6/2009 | Panosian |
| 2009/0145866 A1 | 6/2009 | Panosian et al. |
| 2009/0145913 A1 | 6/2009 | Panosian et al. |
| 2009/0178946 A1 | 7/2009 | Patstone et al. |
| 2009/0180853 A1 | 7/2009 | Gang |
| 2009/0236482 A1 | 9/2009 | Winig et al. |
| 2009/0288970 A1 | 11/2009 | Katz et al. |
| 2010/0052276 A1 | 3/2010 | Brunner |
| 2010/0066069 A1 | 3/2010 | Bradshaw |
| 2010/0133213 A1 | 6/2010 | Kao |
| 2010/0139566 A1 | 6/2010 | Lopuszanski |
| 2010/0147642 A1 | 6/2010 | Andochick |
| 2010/0219193 A1 | 9/2010 | Becklin |
| 2010/0290877 A1 | 11/2010 | Landau et al. |
| 2011/0068562 A1 | 3/2011 | Keffeler |
| 2011/0073516 A1 | 3/2011 | Zelinskiy |
| 2011/0139665 A1 | 6/2011 | Madsen |
| 2011/0155613 A1 | 6/2011 | Koenig et al. |
| 2011/0174939 A1 | 7/2011 | Taylor |
| 2011/0181008 A1 | 7/2011 | Bensman |
| 2011/0187248 A1 | 8/2011 | Kao |
| 2011/0192810 A1 | 8/2011 | Kao |
| 2011/0220531 A1 | 9/2011 | Meether et al. |
| 2011/0233160 A1 | 9/2011 | Chen |
| 2011/0260588 A1 | 10/2011 | Lin |
| 2011/0278336 A1 | 11/2011 | Landrum |
| 2012/0061930 A1 | 3/2012 | Lin |
| 2012/0073995 A1 | 3/2012 | Parker |
| 2012/0152800 A1 | 6/2012 | Parzy et al. |
| 2012/0160886 A1 | 6/2012 | Henny et al. |
| 2012/0180250 A1 | 7/2012 | Ricklefsen et al. |
| 2012/0207571 A1 | 8/2012 | Scott |
| 2012/0292213 A1 | 11/2012 | Brunner |
| 2012/0292870 A1 | 11/2012 | Cowie |
| 2012/0326406 A1 | 12/2012 | Lifshitz |
| 2013/0024468 A1 | 1/2013 | Kocsis |
| 2013/0031731 A1 | 2/2013 | Hess |
| 2013/0031732 A1 | 2/2013 | Hess et al. |
| 2013/0068903 A1 | 3/2013 | O'Keene |
| 2013/0121783 A1 | 5/2013 | Kelly |
| 2013/0127129 A1 | 5/2013 | Bensman et al. |
| 2013/0146551 A1 | 6/2013 | Simpson et al. |
| 2013/0154218 A1 | 6/2013 | Tiilikainen |
| 2013/0206139 A1 | 8/2013 | Krepel et al. |
| 2013/0223971 A1 | 8/2013 | Grace, IV |
| 2014/0062042 A1 | 3/2014 | Wagner et al. |
| 2014/0076759 A1 | 3/2014 | Roehm et al. |
| 2014/0161518 A1 | 6/2014 | Ko |
| 2014/0166516 A1 | 6/2014 | Martinez |
| 2014/0197059 A1 | 7/2014 | Evans et al. |
| 2014/0263512 A1 | 9/2014 | McCoy |
| 2014/0265440 A1 | 9/2014 | Chen |
| 2015/0021371 A1 | 1/2015 | Ward |
| 2015/0034515 A1 | 2/2015 | Monyak et al. |
| 2015/0115786 A1 | 4/2015 | Manalang |
| 2015/0274362 A1 | 10/2015 | Christopher et al. |
| 2015/0376917 A1 | 12/2015 | Brunner |
| 2016/0023349 A1 | 1/2016 | Hoppe et al. |
| 2016/0130034 A1 | 5/2016 | Kuhls |
| 2016/0144500 A1 | 5/2016 | Chen |
| 2016/0168880 A1 | 6/2016 | Phelan |
| 2016/0213115 A1 | 7/2016 | Gonitianer et al. |
| 2016/0214451 A1 | 7/2016 | Harrison |
| 2016/0221177 A1 | 8/2016 | Reinhart |
| 2016/0244209 A1 | 8/2016 | Hain |
| 2017/0001655 A1 | 1/2017 | Huang |
| 2017/0049250 A1 | 2/2017 | Oren |
| 2017/0121056 A1 | 5/2017 | Wang |
| 2017/0138382 A1 | 5/2017 | Ko |
| 2017/0158216 A1 | 6/2017 | Yahav et al. |
| 2017/0165828 A1 | 6/2017 | Fleischmann |
| 2017/0166352 A1* | 6/2017 | Hoppe .................. B25H 3/022 |
| 2017/0174392 A1 | 6/2017 | De Loynes |
| 2017/0217464 A1 | 8/2017 | Bar-erez et al. |
| 2017/0223864 A1 | 8/2017 | Jost |
| 2017/0239808 A1 | 8/2017 | Hoppe |
| 2017/0257958 A1 | 9/2017 | Sabbag et al. |
| 2017/0266804 A1 | 9/2017 | Kinskey |
| 2017/0274829 A1 | 9/2017 | Huebner |
| 2017/0318927 A1 | 11/2017 | Kraus |
| 2017/0349013 A1 | 12/2017 | Gronholm |
| 2018/0000234 A1 | 1/2018 | White |
| 2018/0044059 A1 | 2/2018 | Brunner |
| 2018/0099405 A1 | 4/2018 | Reinhart |
| 2018/0141718 A1 | 5/2018 | Ahlstrom |
| 2018/0153312 A1 | 6/2018 | Buck et al. |
| 2018/0161975 A1* | 6/2018 | Brunner .................. B62B 1/14 |
| 2018/0186513 A1 | 7/2018 | Brunner |
| 2018/0220758 A1 | 8/2018 | Burchia |
| 2018/0290288 A1 | 10/2018 | Brunner |
| 2018/0306487 A1 | 10/2018 | Huish |
| 2018/0334287 A1* | 11/2018 | Schaefer ............ B65D 25/2841 |
| 2018/0340356 A1 | 11/2018 | Brennan |
| 2019/0002004 A1* | 1/2019 | Brunner .................. B25H 3/023 |
| 2019/0031222 A1 | 1/2019 | Takyar et al. |
| 2019/0039781 A1 | 2/2019 | Kogel |
| 2019/0061636 A1 | 2/2019 | Foster |
| 2019/0106244 A1 | 4/2019 | Brunner et al. |
| 2019/0111956 A1 | 4/2019 | Philips |

(56) References Cited

U.S. PATENT DOCUMENTS

| | | | |
|---|---|---|---|
| 2019/0135189 A1 | 5/2019 | Clark | |
| 2019/0225371 A1 | 7/2019 | Hoppe et al. | |
| 2019/0225374 A1 | 7/2019 | McCrea et al. | |
| 2019/0359144 A1 | 11/2019 | Hyatt | |
| 2019/0375338 A1 | 12/2019 | Deninno | |
| 2020/0039553 A1 | 2/2020 | Abohammdan | |
| 2020/0055534 A1 | 2/2020 | Hassell | |
| 2020/0078929 A1 | 3/2020 | Liu | |
| 2020/0079408 A1 | 3/2020 | Christie | |
| 2020/0130440 A1 | 4/2020 | Fuller | |
| 2020/0147781 A1* | 5/2020 | Squiers | B65D 21/0223 |
| 2020/0165036 A1* | 5/2020 | Squiers | A45C 7/0045 |
| 2020/0178686 A1 | 6/2020 | Hermann | |
| 2020/0243925 A1 | 7/2020 | Polakowski et al. | |
| 2020/0284425 A1 | 9/2020 | Plato | |
| 2020/0299027 A1 | 9/2020 | Brunner et al. | |
| 2020/0346819 A1 | 11/2020 | Kogel et al. | |
| 2020/0360741 A1 | 11/2020 | Liu | |
| 2021/0031975 A1* | 2/2021 | Brunner | B65D 21/0228 |
| 2021/0039831 A1 | 2/2021 | Brunner et al. | |
| 2021/0046882 A1 | 2/2021 | Schmidt | |
| 2021/0094600 A1 | 4/2021 | Brunner et al. | |
| 2021/0104909 A1 | 4/2021 | Mantych | |
| 2021/0154824 A1 | 5/2021 | Barton | |
| 2021/0177134 A1 | 6/2021 | Adams | |
| 2021/0205979 A1 | 7/2021 | Jessop | |
| 2021/0221561 A1 | 7/2021 | Davidian et al. | |
| 2021/0245226 A1 | 8/2021 | Woidasky | |
| 2021/0267368 A1* | 9/2021 | Bruins | F16B 12/38 |
| 2021/0300447 A1 | 9/2021 | Brunner | |
| 2021/0305824 A1 | 9/2021 | Shirazi | |
| 2021/0316667 A1 | 10/2021 | Pinkston | |
| 2021/0316909 A1 | 10/2021 | Vargo et al. | |
| 2022/0016799 A1 | 1/2022 | Westbrook | |
| 2022/0017020 A1 | 1/2022 | McFadden | |
| 2022/0144326 A1 | 5/2022 | Williams | |
| 2022/0234509 A1 | 7/2022 | Wright | |
| 2022/0322828 A1 | 10/2022 | Barton | |
| 2022/0402113 A1 | 12/2022 | Brunner | |
| 2023/0020398 A1 | 1/2023 | Sutton | |
| 2023/0079766 A1 | 3/2023 | Wallace | |
| 2023/0150725 A1 | 5/2023 | Baron | |
| 2023/0202025 A1 | 6/2023 | Chen | |
| 2023/0234212 A1 | 7/2023 | Lownik | |
| 2023/0257163 A1 | 8/2023 | Fleherty | |
| 2023/0301429 A1 | 9/2023 | Braun | |
| 2023/0411975 A1 | 12/2023 | Roberts | |
| 2024/0010390 A1 | 1/2024 | Braun | |
| 2024/0025204 A1 | 1/2024 | Goodwin | |
| 2024/0149934 A1 | 5/2024 | Panosian | |
| 2024/0150071 A1 | 5/2024 | Panosian | |
| 2024/0150079 A1 | 5/2024 | Panosian | |
| 2024/0150094 A1 | 5/2024 | Panosian | |
| 2024/0190612 A1 | 6/2024 | Christopher | |
| 2024/0200561 A1 | 6/2024 | Ran | |
| 2024/0208040 A1 | 6/2024 | Coons | |
| 2024/0246724 A1 | 7/2024 | Hoppe | |
| 2024/0253207 A1 | 8/2024 | Baruch | |
| 2024/0326707 A1 | 10/2024 | Taylor | |
| 2024/0359632 A1 | 10/2024 | Sartin | |
| 2024/0399967 A1 | 12/2024 | Deshpande | |
| 2025/0074323 A1 | 3/2025 | Schroeder | |
| 2025/0178540 A1 | 6/2025 | Sartin | |

FOREIGN PATENT DOCUMENTS

| | | |
|---|---|---|
| CN | 200947356 | 9/2007 |
| CN | 101068661 | 11/2007 |
| CN | 101362464 | 2/2009 |
| CN | 101821148 | 9/2010 |
| CN | 101837854 | 9/2010 |
| CN | 102042354 | 5/2011 |
| CN | 102137795 | 7/2011 |
| CN | 102186714 | 9/2011 |
| CN | 102248523 | 11/2011 |
| CN | 102469899 | 5/2012 |
| CN | 202264971 | 6/2012 |
| CN | 102608238 | 7/2012 |
| CN | 102834035 | 12/2012 |
| CN | 302371147 | 3/2013 |
| CN | 103118578 | 5/2013 |
| CN | 103659777 | 3/2014 |
| CN | 204161752 | 2/2015 |
| CN | 107249378 | 10/2017 |
| CN | 107428436 | 12/2017 |
| DE | 3510307 | 9/1986 |
| DE | 9313802 | 12/1993 |
| DE | 4415638 | 11/1995 |
| DE | 29708343 | 7/1997 |
| DE | 19750543 | 5/1999 |
| DE | 20218996 | 3/2003 |
| DE | 102004057870 | 6/2006 |
| DE | 202011002617 | 4/2011 |
| DE | 102010003754 | 10/2011 |
| DE | 102010003756 | 10/2011 |
| DE | 102012106482 | 1/2014 |
| DE | 102012220837 | 5/2014 |
| DE | 202014103695 | 10/2014 |
| DE | 202015105053 | 10/2016 |
| DE | 202015005752 | 11/2016 |
| DE | 102015112204 | 2/2017 |
| DE | 102015013053 | 4/2017 |
| DE | 402018201520 | 5/2018 |
| EP | 0916302 | 5/1999 |
| EP | 1321247 | 6/2003 |
| EP | 1428764 B1 | 6/2004 |
| EP | 1724069 A2 | 11/2006 |
| EP | 1819487 | 8/2007 |
| EP | 1925406 | 5/2008 |
| EP | 2289671 | 3/2011 |
| EP | 2346741 | 7/2011 |
| EP | 2456341 | 5/2012 |
| EP | 2543297 | 1/2013 |
| EP | 2555660 | 2/2013 |
| EP | 2555661 | 2/2013 |
| EP | 2537641 B1 | 9/2016 |
| EP | 2338650 B1 | 10/2016 |
| EP | 2805799 | 11/2016 |
| EP | 3141354 | 3/2017 |
| GB | 694707 | 7/1953 |
| GB | 2047181 B | 2/1983 |
| GB | 2110076 | 6/1983 |
| GB | 2211486 | 7/1989 |
| GB | 2330521 | 4/1999 |
| GB | 2406331 | 3/2005 |
| GB | 2413265 | 10/2005 |
| GB | 2449934 | 12/2008 |
| JP | 2003194020 A | 7/2003 |
| JP | D1180963 | 8/2003 |
| JP | 1276744 | 7/2006 |
| JP | D1395115 | 8/2010 |
| JP | D1395116 | 8/2010 |
| JP | D1455321 | 11/2012 |
| JP | 2013022972 | 2/2013 |
| JP | 2013022976 | 2/2013 |
| JP | 1477050 | 8/2013 |
| JP | 2014-117961 | 6/2014 |
| JP | D1503434 | 7/2014 |
| JP | D1625407 | 2/2019 |
| JP | D1665028 | 8/2020 |
| KR | 30-0271616 | 2/2000 |
| KR | 30-0320243 | 6/2002 |
| KR | 3008066040000 | 7/2015 |
| KR | 3008422360000 | 3/2016 |
| KR | 3008496000000 | 4/2016 |
| KR | 3008599650000 | 6/2016 |
| KR | 3008812960000 | 11/2016 |
| KR | 3009995990000 | 3/2019 |
| TW | 206875 | 5/1993 |
| TW | I324578 | 5/2010 |
| TW | 135074 | 6/2010 |
| TW | 168686 | 7/2015 |
| TW | 174412 | 3/2016 |
| TW | D192092 | 8/2018 |

(56) References Cited

FOREIGN PATENT DOCUMENTS

| WO | WO2005/045886 | 5/2005 |
|---|---|---|
| WO | WO2006/099638 | 9/2006 |
| WO | WO2007/121746 | 11/2007 |
| WO | WO07121745 | 11/2007 |
| WO | WO07121746 | 11/2007 |
| WO | WO2007121745 A1 | 11/2007 |
| WO | WO2008/090546 | 7/2008 |
| WO | WO2009/140965 | 11/2009 |
| WO | WO09140965 | 11/2009 |
| WO | WO2011/000387 | 1/2011 |
| WO | WO2011/009480 | 1/2011 |
| WO | WO11009480 | 1/2011 |
| WO | WO2011/032568 | 3/2011 |
| WO | WO2013/026084 | 2/2013 |
| WO | WO13026084 | 2/2013 |
| WO | WO2014/125484 | 8/2014 |
| WO | WO2014/125488 | 8/2014 |
| WO | WO14125488 | 8/2014 |
| WO | WO2016142935 | 9/2016 |
| WO | WO2016/187652 | 12/2016 |
| WO | WO2017028845 | 2/2017 |
| WO | WO2017/098513 | 6/2017 |
| WO | WO2017191628 | 11/2017 |
| WO | WO2017/212840 | 12/2017 |
| WO | WO17212840 | 12/2017 |
| WO | WO2018010859 | 1/2018 |
| WO | WO2018/213560 | 11/2018 |
| WO | WO2019/028041 | 2/2019 |

OTHER PUBLICATIONS

International Search Report and Written Opinion for International Application No. PCT/US2018/044629, dated Jan. 9, 2019, 22 pages.
Stuart, "Sys-Cart Base, a Systainer Mounting Platform," TOOLGUYD, allegedly available on Jul. 28, 2014, https://toolguyd.com/systainer-sys-cart-mounting-base/, 10 pages.
"BluCave Universal Storage System," BATAVIA Tools to Build, https://batavia.eu/blucave-storage-system/, available at least as early as Jun. 11, 2019, 9 pages.
"Dewalt TSTAK Carrier Trolley," ITS, https://www.its.co.uk/pd/171229-Dewalt-TSTAK-Carrier-Trolley-DEW171229.htm, available at least as early as Jun. 11, 2019, 3 pages.
"Tool Skool, TSTAK Phase 2 Upgrades | TSTAK Carts—First Look—Tool Skool," YouTube, allegedly available on Sep. 7, 2013, https://www.youtube.com/watch?v=jb06y6J1dr4&feature=youtu.be&t=197, 1 page.
"DeWalt TSTAK Vac Rack (Suits DW DWV902M & DWV900L) DWV9500-XJ," Get Tools Direct, https://www.gettoolsdirect.com.au/dewalt-tstak-vac-rack-suits-dwv902m-and-dwv9001-dwv9500-xj.html, available at least as early as Jun. 11, 2019, 4 pages.
Stuart, "Ryobi ToolBlox Tool Cabinet System!," TOOLGUYD, allegedly available on Sep. 19, 2014, https://toolguyd.com/ryobi-toolblox-cabinets/, 23 pages.
"Blitz Box—Portable Storage Box / Shelf," The Green Head Finds Cool New Stuff, https://www.thegreenhead.com/2013/03/blitz-box-portable-storage-box-shelf.php, available at least as early as Jun. 11, 2019, 8 pages.
"Hopkins FloTool 91002 Rhino Box with Mount," Amazon.com, https://www.amazon.com/exec/obidos/ASIN/B003K15F31/20140000-20, available at least as early as Jun. 11, 2019, 7 pages.
Sortimo Logistix, "Mobile Sortimente", brochure, available at least as early as Jun. 11, 2019, 17 pages.
International Search Report and Written Opinion for International Application No. PCT/US2019/014940, dated Jul. 26, 2019, 9 pages.
International Search Report and Written Opinion for International Application No. PCT/IL2019/050689, dated Aug. 23, 2019, 21 pages.
Stuart, "Sys-Cart Base, a Systainer Mounting Platform," TOOLGUYD, Jul. 28, 2014, https://toolguyd.com/systainer-sys-cart-mounting-base/, 11 pages.
"BluCave Universal Storage System," BATAVIA Tools to Build, https://batavia.eu/blucave-storage-system/, believed to be available at least as early as Nov. 29, 2017, 5 pages.
"Dewalt TSTAK Carrier Trolley," ITS, https://www.its.co.uk/pd/171229-Dewalt-TSTAK-Carrier-Trolley-_DEW171229.htm, Per Wayback, website dates back to May 2, 2015, 2 pages.
"Tool Skool, TSTAK Phase 2 Upgrades | TSTAK Carts—First Look—Tool Skool," YouTube, Sep. 7, 2013, https://www.youtube.com/watch?v=jb06y6J1dr4&feature=youtu.be&t=197, 1 page.
"DeWalt TSTAK Vac Rack (Suits DW DWV902M & DWV900L) DWV9500-XJ," Get Tools Direct, https://www.gettoolsdirect.com.au/dewalt-tstak-vac-rack-suits-dwv902m-and-dwv9001-dwv9500-xj.html, believed to be available at least as early as Nov. 29, 2017, 4 pages.
Stuart, "Ryobi ToolBlox Tool Cabinet System!," TOOLGUYD, Sep. 18, 2014, https://toolguyd.com/ryobi-toolblox-cabinets/, 23 pages.
"Blitz Box—Portable Storage Box / Shelf," The Green Head Finds Cool New Stuff, https://www.thegreenhead.com/2013/03/blitz-box-portable-storage-box-shelf.php, Per Wayback, website dates back to Feb. 15, 2015, 5 pages.
"Hopkins FloTool 91002 Rhino Box with Mount," Amazon.com, https://www.amazon.com/exec/obidos/ASIN/B003K15F31/20140000-20, believed to be available at least as early as Nov. 29, 2017, 7 pages.
Sortimo Logistix, "Mobile Sortimente", brochure, believed to be available at least as early as Nov. 29, 2017, 17 pages.
BluCave Video, https://www.youtube.com/watch?v=Sw7fQQPwoOtY&feature=youtu.be&t=32, believed to be available at least as early as Nov. 29, 2017.
Batavia Gmbh, BluCave Storage System, https://protect-us.mimecast.com/s/5XIGCR6KypcgJnlKi9EDoim?domain=batavia.eu, believed to be available at least as early as Nov. 29, 2017, 7 pages.
Vertak, https://www.alibaba.com/product-detail/Vertak-global-patented-multi-funciton-portable_60217794260.html, believed to be available at least as early as Nov. 29, 2017.
International Search Report and Written Opinion for International Application No. PCT/IL2020/050433, dated Jun. 21, 2020, 14 pages.
Inter Partes Review No. 2021-00373, "Petition for Inter Partes Review of U.S. Pat. No. 10,583,962" Filed Jan. 5, 2021, 198 pages.
Exhibit 1001 in Petition for Inter Partes Review of U.S. Pat. No. 10,583,962, filed Jan. 5, 2021, 64 Pages.
Exhibit 1002 in Petition for Inter Partes Review of U.S. Pat. No. 10,583,962, filed Jan. 5, 2021, 75 Pages.
Exhibit 1003 in Petition for Inter Partes Review of U.S. Pat. No. 10,583,962, filed Jan. 5, 2021, 13 Pages.
Exhibit 1004 in Petition for Inter Partes Review of U.S. Pat. No. 10,583,962, filed Jan. 5, 2021, 18 Pages.
Exhibit 1005 in Petition for Inter Partes Review of U.S. Pat. No. 10,583,962, filed Jan. 5, 2021, 9 Pages.
Exhibit 1006 in Petition for Inter Partes Review of U.S. Pat. No. 10,583,962, filed Jan. 5, 2021, 176 Pages.
Exhibit 1007 in Petition for Inter Partes Review of U.S. Pat. No. 10,583,962, filed Jan. 5, 2021, 22 Pages.
Exhibit 1008 in Petition for Inter Partes Review of U.S. Pat. No. 10,583,962, filed Jan. 5, 2021, 6 Pages.
Exhibit 1009 in Petition for Inter Partes Review of U.S. Pat. No. 10,583,962, filed Jan. 5, 2021, 24 Pages.
Exhibit 1010 in Petition for Inter Partes Review of U.S. Pat. No. 10,583,962, filed Jan. 5, 2021, 19 Pages.
Exhibit 1011 in Petition for Inter Partes Review of U.S. Pat. No. 10,583,962, filed Jan. 5, 2021, 26 Pages.
Exhibit 1012 in Petition for Inter Partes Review of U.S. Pat. No. 10,583,962, filed Jan. 5, 2021, 3 Pages.
Exhibit 1013 in Petition for Inter Partes Review of U.S. Pat. No. 10,583,962, filed Jan. 5, 2021, 168 Pages.
Exhibit 1014 in Petition for Inter Partes Review of U.S. Pat. No. 10,583,962, filed Jan. 5, 2021, 481 Pages.
Exhibit 1015 in Petition for Inter Partes Review of U.S. Pat. No. 10,583,962, filed Jan. 5, 2021, 6 Pages.
Exhibit 1016 in Petition for Inter Partes Review of U.S. Pat. No. 10,583,962, filed Jan. 5, 2021, 242 Pages.

(56) References Cited

OTHER PUBLICATIONS

Exhibit 1017 in Petition for Inter Partes Review of U.S. Pat. No. 10,583,962, filed Jan. 5, 2021, 6 Pages.
Exhibit 1018 in Petition for Inter Partes Review of U.S. Pat. No. 10,583,962, filed Jan. 5, 2021, 250 Pages.
Exhibit 1019 in Petition for Inter Partes Review of U.S. Pat. No. 10,583,962, filed Jan. 5, 2021, 44 Pages.
Exhibit 1020 in Petition for Inter Partes Review of U.S. Pat. No. 10,583,962, filed Jan. 5, 2021, 5 Pages.
Exhibit 1021 in Petition for Inter Partes Review of U.S. Pat. No. 10,583,962, filed Jan. 5, 2021, 1 Pages.
Exhibit 1022 in Petition for Inter Partes Review of U.S. Pat. No. 10,583,962, filed Jan. 5, 2021, 1 Pages.
Exhibit 1023 in Petition for Inter Partes Review of U.S. Pat. No. 10,583,962, filed Jan. 5, 2021, 24 Pages.
Exhibit 1024 in Petition for Inter Partes Review of U.S. Pat. No. 10,583,962, filed Jan. 5, 2021, 28 Pages.
Non-Final Rejection issued Jan. 24, 2019, in U.S. Appl. No. 16/216,724.
Final Rejection issued Nov. 28, 2018, in U.S. Appl. No. 15/826,232, 14 pages.
Non-Final Rejection issued Apr. 12, 2018, in U.S. Appl. No. 15/826,201.
Extended European search report for application No. 18892505.1 dated Sep. 17, 2021.

* cited by examiner

TOOL STORAGE

CROSS-REFERENCE TO RELATED PATENT APPLICATIONS

This application is a continuation of U.S. application Ser. No. 19/095,623, filed Mar. 31, 2025, which is a continuation of U.S. application Ser. No. 17/736,749, filed May 4, 2022, now U.S. Pat. No. 12,286,267, which is a continuation of U.S. application Ser. No. 16/280,432, now U.S. Pat. No. 11,338,959, filed Feb. 20, 2019, which is a continuation of International Application No. PCT/US2019/014940, filed Jan. 24, 2019, which claims priority from U.S. Application No. 62/621,403, titled "Tool Storage," filed Jan. 24, 2018, the contents of each of which are incorporated herein in their entireties.

BACKGROUND OF THE INVENTION

The present invention relates generally to the field of storage units, and more specifically to tool storage units.

Tool storage units are often used to transport tools and tool accessories. Some tool storage units are designed to be easily transported, some are designed to be stationary, and some are designed with either possibility in mind. Tool storage units include walls that may be either soft-sided (e.g., a strong fabric) or hard-sided (e.g., plastic).

SUMMARY OF THE INVENTION

In one embodiment, a container assembly comprises a first container and a second container. The first container comprises a latch and a coupler extending from a face of the first container. The first coupler comprises a body and an overhang extending from the body over the face of the first container. The second container comprises a latch receptacle configured to interface with the latch and a coupling wall extending outwardly away from an exterior wall of the second container. The coupling wall comprises one or more rib walls that extend from an end of the coupling wall opposite the exterior wall, the coupling wall configured to engage with the first coupler. In another embodiment the coupling wall comprises two coupling walls that each comprise a rib wall, and the two coupling walls are configured to collectively engage the first coupler.

In another embodiment the coupler comprises first and second couplers, and the coupling wall comprises first, second and third coupling walls. The first and second coupling walls are configured to collectively engage the first coupler and the second and third coupling walls are configured to collectively engage the second coupler.

In another embodiment the coupler comprises at least four couplers and the coupling wall comprises at least six coupling walls. The first coupler is configured to collectively engage the first and second coupling walls, the second coupler is configured to collectively engage the second and third coupling walls, the third coupler is configured to collectively engage the fourth and fifth coupling walls, and the fourth coupler is configured to collectively engage the fifth and sixth coupling walls.

In one embodiment, a container assembly comprises a first container and a second container. The first container comprises a first coupler extending above a first face of the first container. The first coupler comprises a body and an overhang extending from the body over the first face. The second container comprises a second face that defines a recess within the second face. The second container further comprises a locking plate disposed above the recess, the locking plate defining an opening configured to receive the first coupler. To engage the first and second containers, the first coupler is placed through the opening and rotated 90 degrees such that the overhang is rotated to be disposed between the second container's second face and locking plate. The first container further comprises a latch that interfaces with a latch receptacle of the second container, locking the two containers together.

In another embodiment, a container assembly comprises a first container and a second container. The first container comprises a first face and a cylinder extending above the first face. In one embodiment the cylinder is coupled to the first face. In another embodiment the cylinder is coupled to a sidewall of the first container. The first container further comprises a threaded component, such as a helical screw, that extends through the cylinder. In one embodiment the first container comprises two cylinders at opposing ends of the first container and the threaded component extends through both cylinders. The second container comprises a second face that defines a threaded receptacle. In one embodiment the threaded receptacle defines a plurality of threaded apertures configured to receive the thread of the helical screw. The threaded component defines a locked position in which the threaded component is received within the threaded receptacle and rotated to couple the two containers together. The threaded component further defines an unlocked position in which the first container and second container can be selectively coupled and decoupled.

In one embodiment the container assembly comprises a first container and a second container. The first container comprises a first face, a retractable cleat extending from the first face, a frame configured to interface with the retractable cleat, and a locking button configured to interface with the frame to toggle the retractable cleat between a locked position and an unlocked position. The second container comprises a second face and a recessed receptacle defined by the second face configured to receive the retractable cleat.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Referring generally to the figures, various embodiments of a stackable tool storage unit are shown. Described herein are various embodiments of stackable and movable tool storage units. One or more of the units are configured to selectively couple and decouple with other units. The coupling mechanisms to couple the units include a cleat and depression system, a cleat and projecting walls system, horizontal ribs, and a cleat that is coupled to a recess and rotated below a locking plate to couple the containers. Other coupling mechanisms described herein include a spring-loaded rail, wire pivots, threaded apertures configured to receive a threaded component, and a retractable cleat, such as a pivoting extension from the cleat and such as a retractable projection extending from the cleat. Other coupling mechanisms include a puck shaped cleat with retractable extensions, a tear-shaped cleat configured to couple with a recess defining an undercut that interfaces with the tear-shaped cleat, cleats with retractable feet, using ball-detents rather than springs to bias retractable components, and a rotatable locking cleat.

Figure 1:
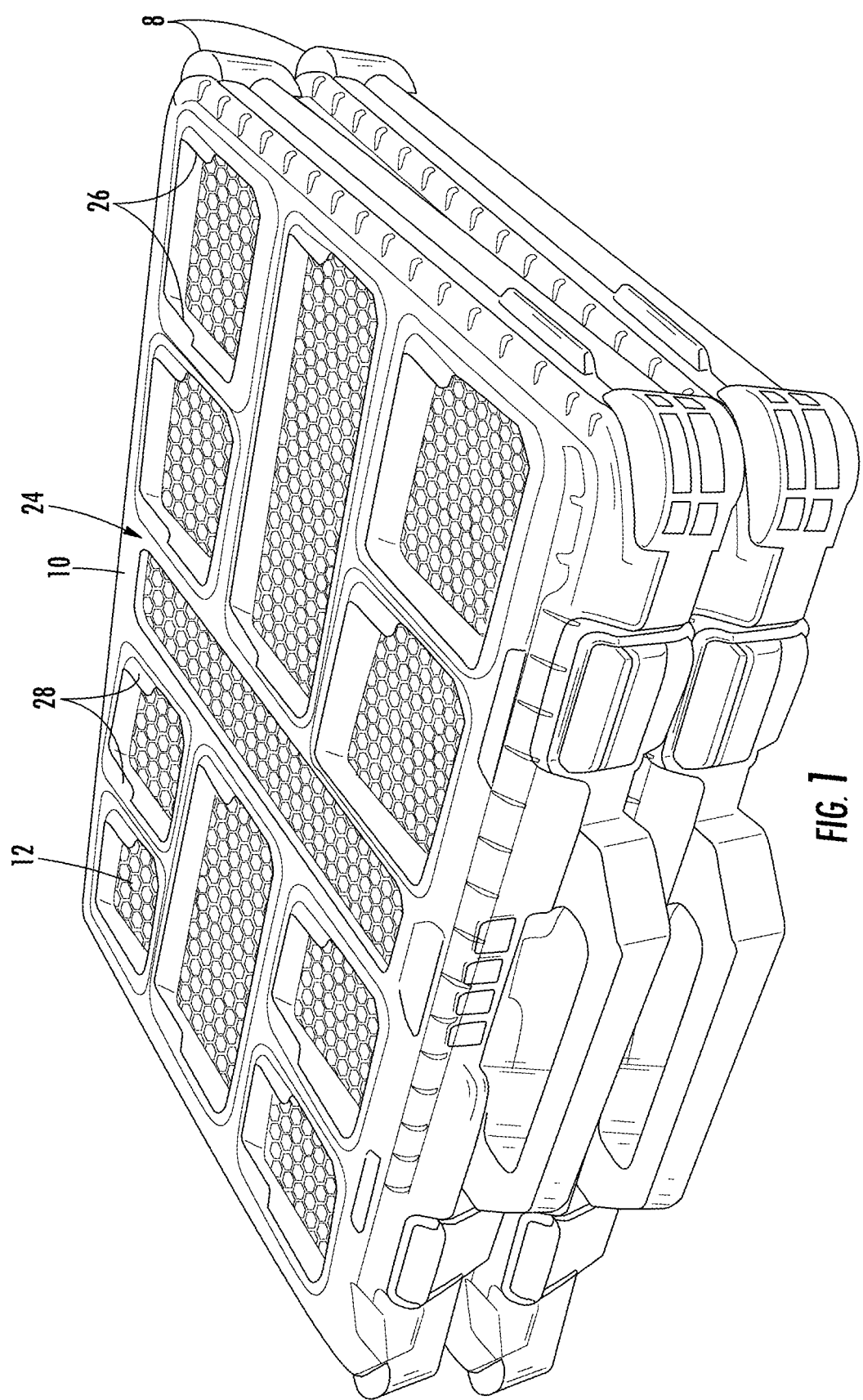
FIG. 1 is a perspective top view of a pair of stacked storage units, according to an exemplary embodiment.

FIG. 1 illustrates an exemplary embodiment of stacked storage containers 8, according to the embodiment of FIGS. 1-4. According to various embodiments, two or more storage containers 8 are selectively coupled together.

Figure 2:
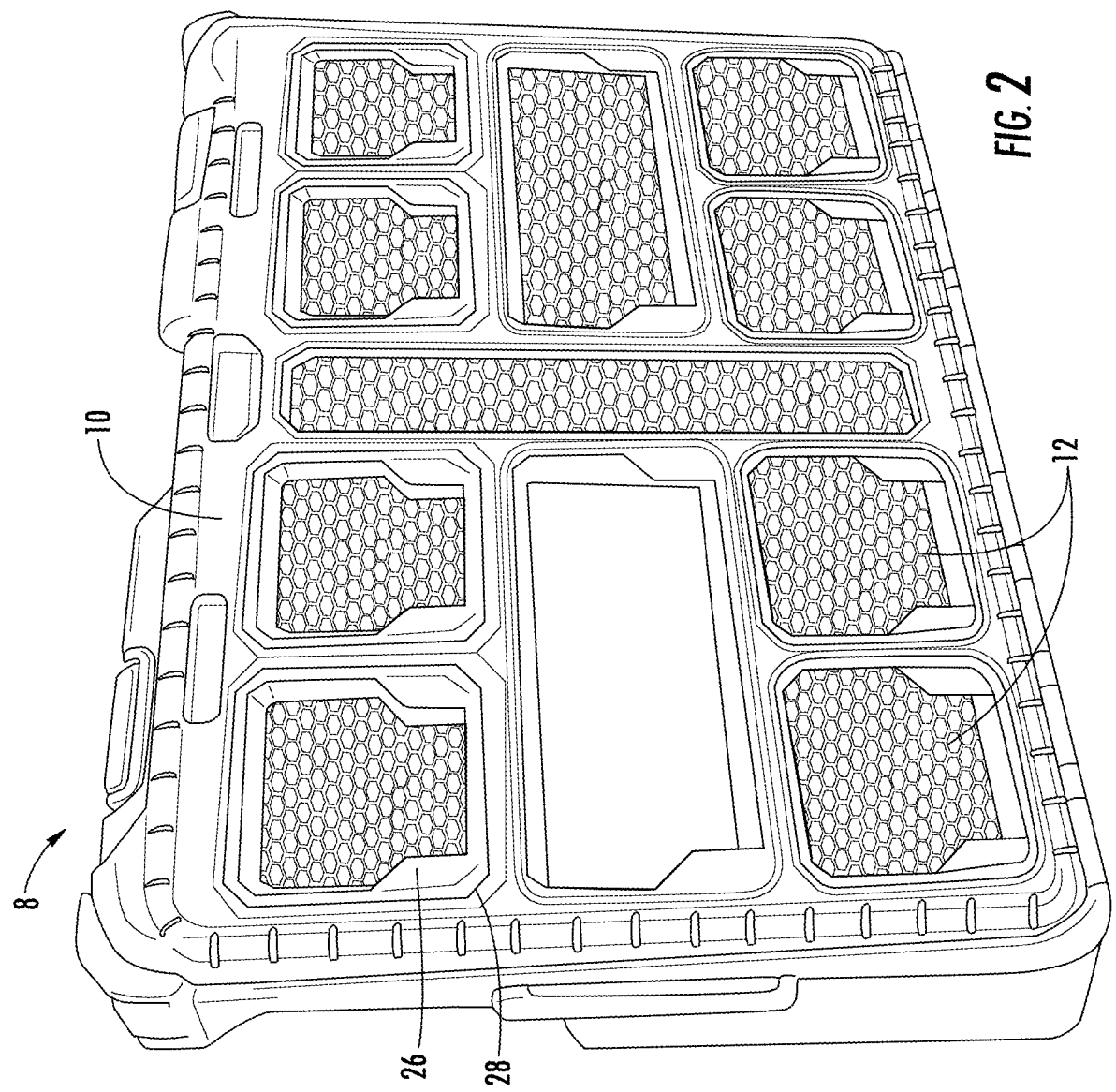
FIG. 2 is a perspective top view of a storage unit, according to an exemplary embodiment.

FIG. 2 illustrates a tool storage container 8 having a lid 10. The lid 10 includes receptacles 12 that receive cleats 14 (FIG. 4) on the bottom the container to stack and attach multiple containers. The receptacles 12 are recessed into the housing of the container.

Figure 3:
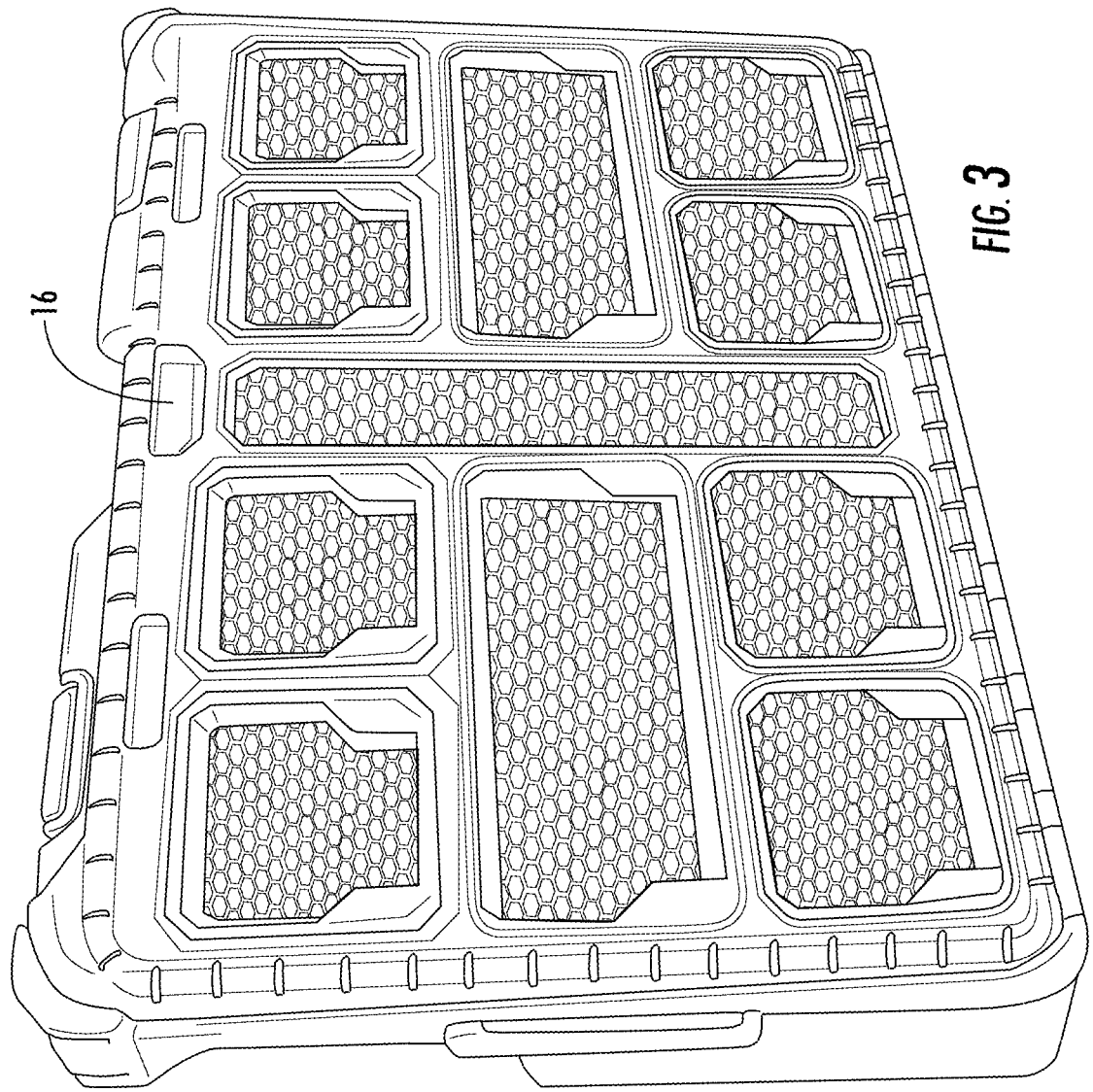
FIG. 3 is a perspective top view of a storage unit, according to an exemplary embodiment.
Figure 4:
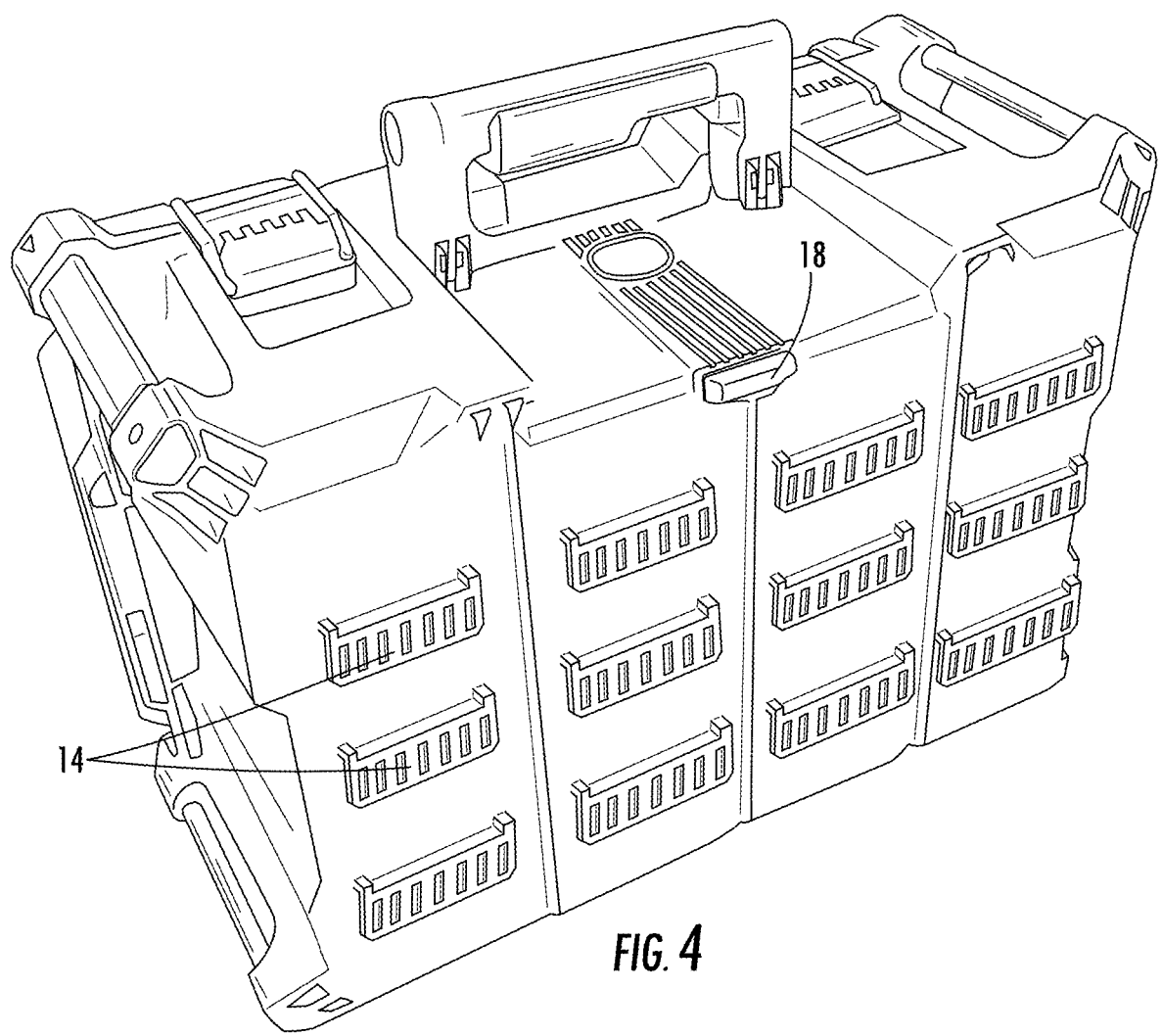
FIG. 4 is a perspective bottom view of a storage unit, according to an exemplary embodiment.

FIG. 3 illustrates the lid 10 of FIG. 2 having a latch receptacle 16. The latch 18 (FIG. 4) and the latch receptacle 16 prevent the two containers from sliding from engagement to disengagement of the cleat system. In another embodiment, the containers do not include the latch and latch receptacles. Rather, the containers include a ball detent (or other similar mechanism) for clicking the two containers or boxes together. The ball detent would not prevent the two boxes from sliding and disengaging, but the ball detent would provide friction that would secure the boxes until a strong enough force is applied to slide the boxes. The detents could be located at any suitable location, such as at the four corners of the lid/bottom surface.

Figure 5:
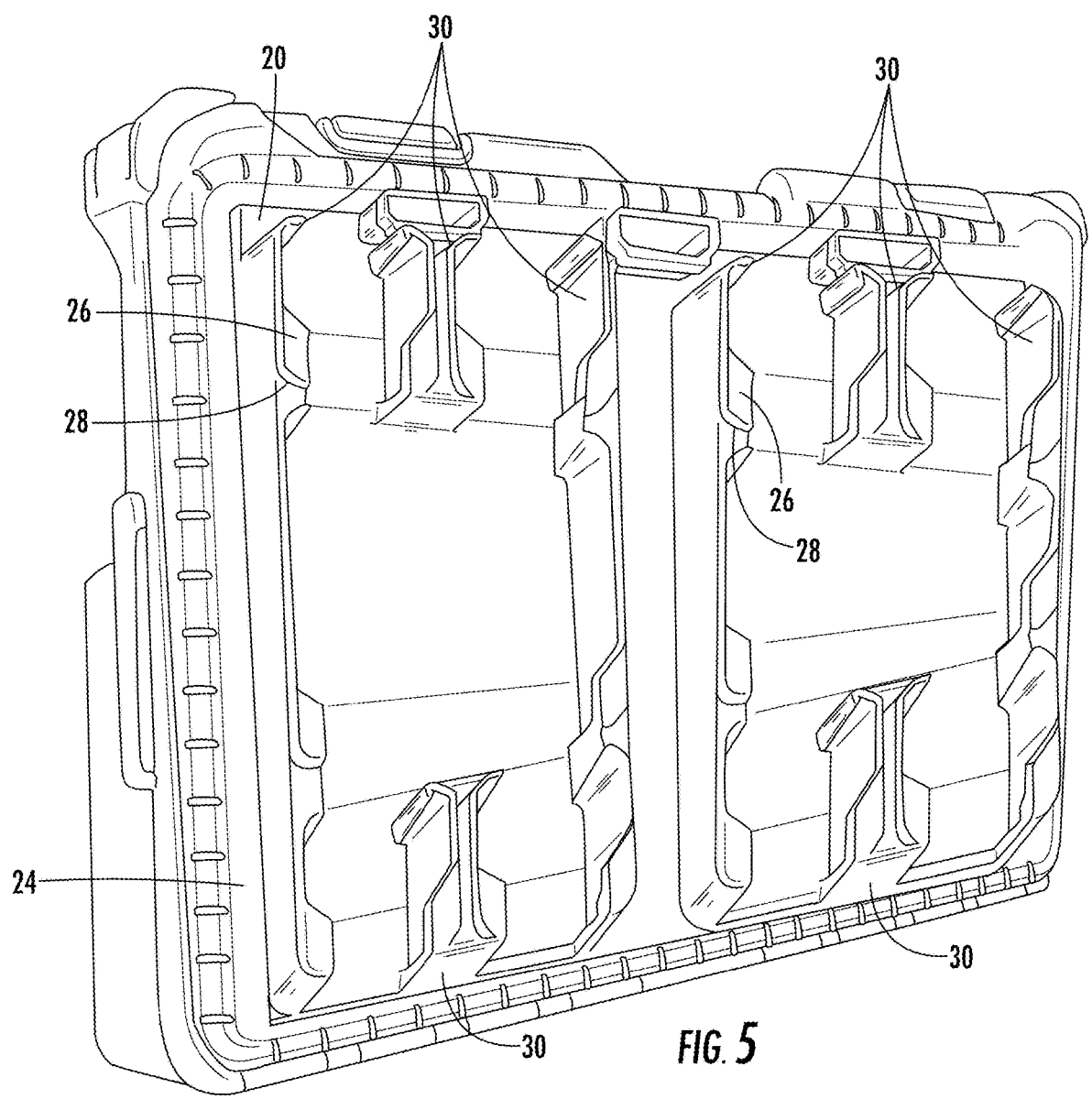
FIG. 5 is a perspective top view of a storage unit, according to an exemplary embodiment.

FIG. 5 illustrates an alternative embodiment of the lid 10 of FIG. 2. The lid 20, instead of having recessed receptacles, the lid has raised guides 22 with fins. Each receptacle would not include a front wall.

Figure 6:
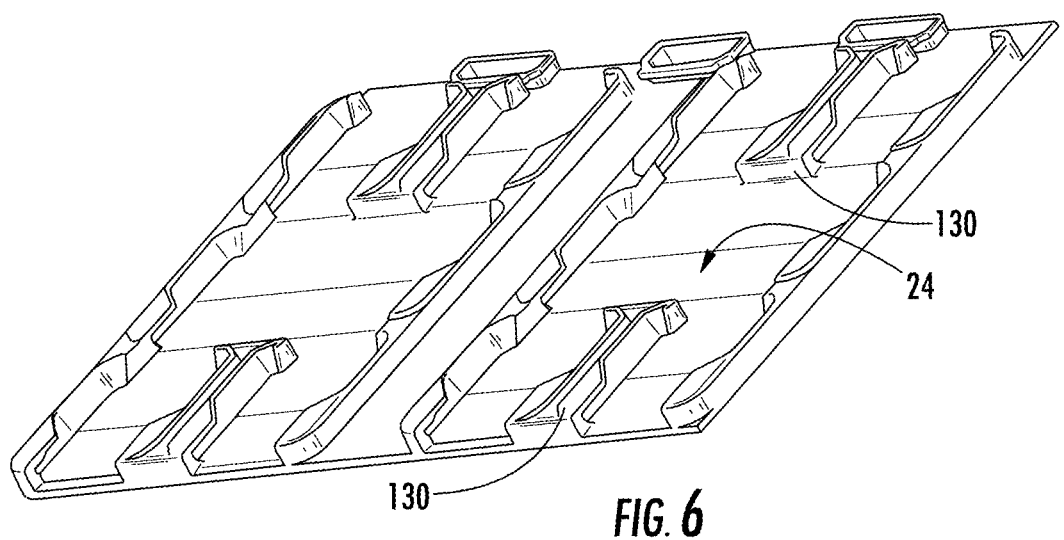
FIG. 6 is a perspective view of a coupling component of FIG. 5, according to an exemplary embodiment.
Figure 7:
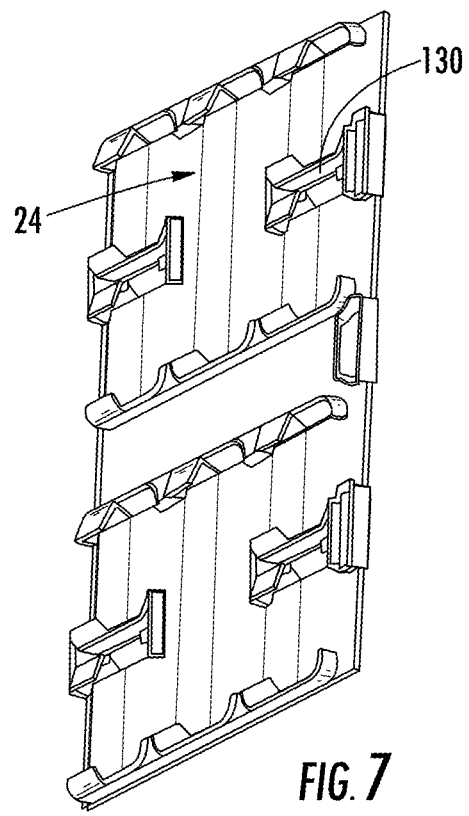
FIG. 7 is a perspective view of a coupling component of FIG. 5, according to an exemplary embodiment.

FIGS. 6 and 7 illustrate an alternative lid for the container 8 of FIG. 2. The lid of FIGS. 6 and 7 includes protruding bosses 130 rather than depressed receptacles.

In the embodiments of FIGS. 5-7, rather than receptacles 12 that recess within top surface 24 of storage container 8, bosses 130 and coupling walls 30 extend perpendicularly outwardly away from top surface 24 (shown as a wall). Cleats 14, such as in FIG. 4, couple with bosses 130 allowing the embodiment(s) of FIGS. 1-4 and the embodiment(s) of FIGS. 5-7 to engage with each other. In the embodiments shown in FIGS. 5-7 there is no back wall 30 between rib walls 26, although it is contemplated herein that a vertical wall may extend between rib walls 26 in a given receptacle 12.

In one embodiment, a single coupling wall 30 is configured to engage cleat a single 14. In another embodiment two coupling walls 30 are configured to collectively engage a single cleat 14. In another embodiment first and second coupling walls 30 are configured to collectively engage a single cleat 14 and second and third coupling walls 30 are configured to collectively engage a second cleat 14.

In another embodiment a single cleat 14 is configured to collectively engage first and second coupling walls 30, a second cleat 14 is configured to collectively engage second and third coupling walls 30, a third cleat 14 is configured to collectively engage fourth and fifth coupling walls 30, and a fourth cleat 14 is configured to collectively engage fifth and sixth coupling walls 30.

Figure 8:
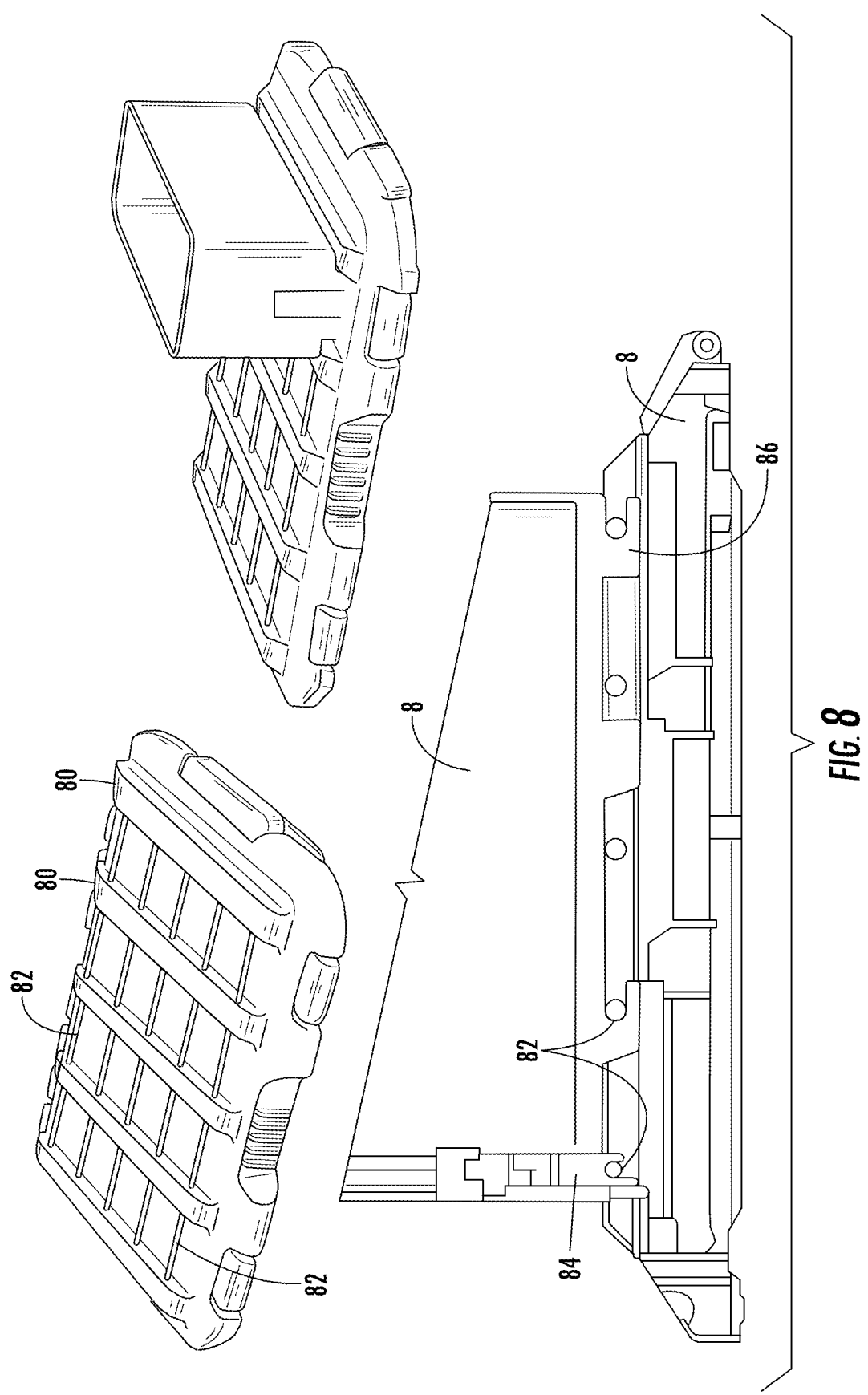
FIG. 8 is several views of a storage unit coupling component, according to an exemplary embodiment.
Figure 9:
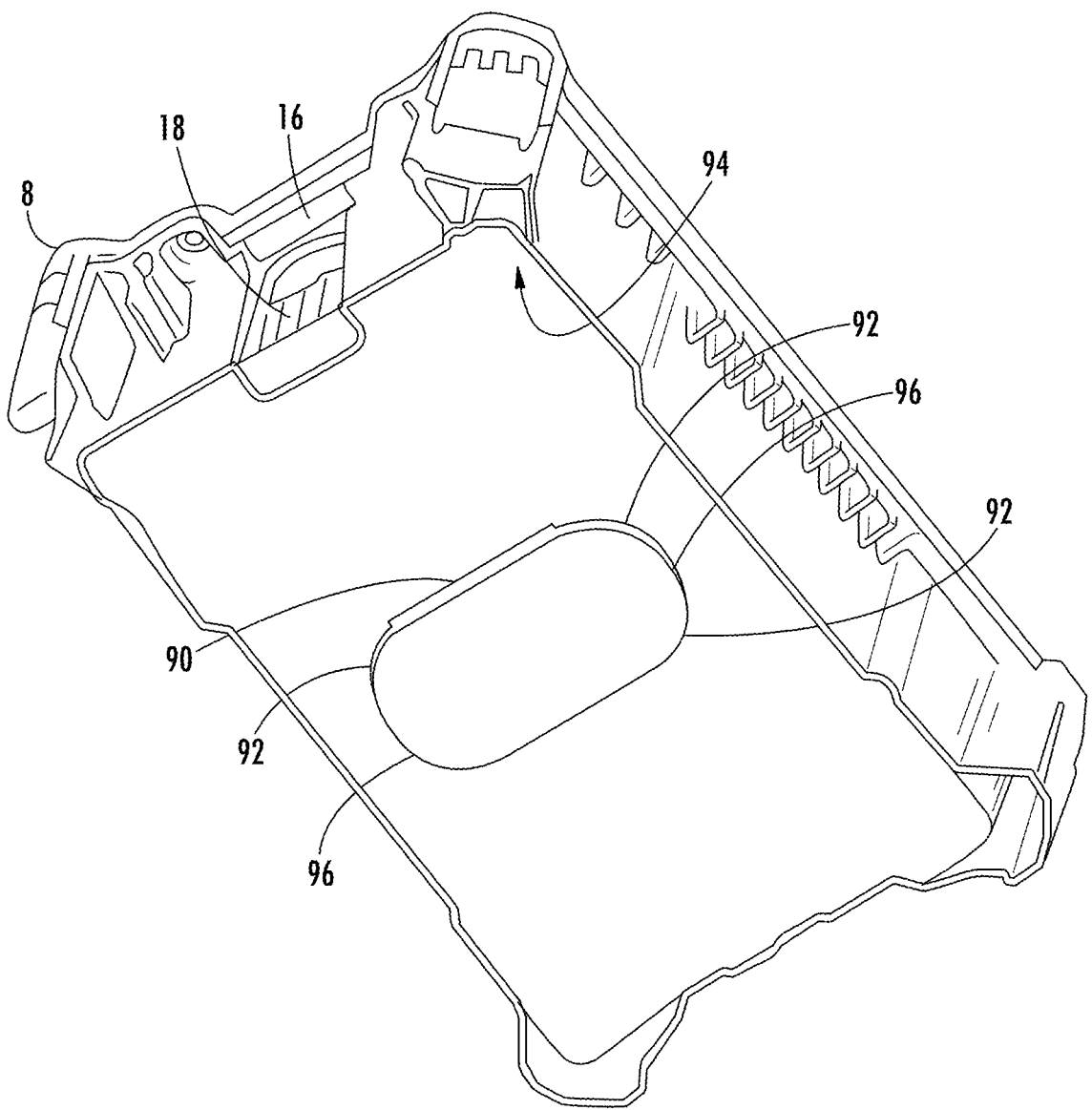
FIG. 9 is a perspective view of a storage unit, according to an exemplary embodiment.
Figure 10:
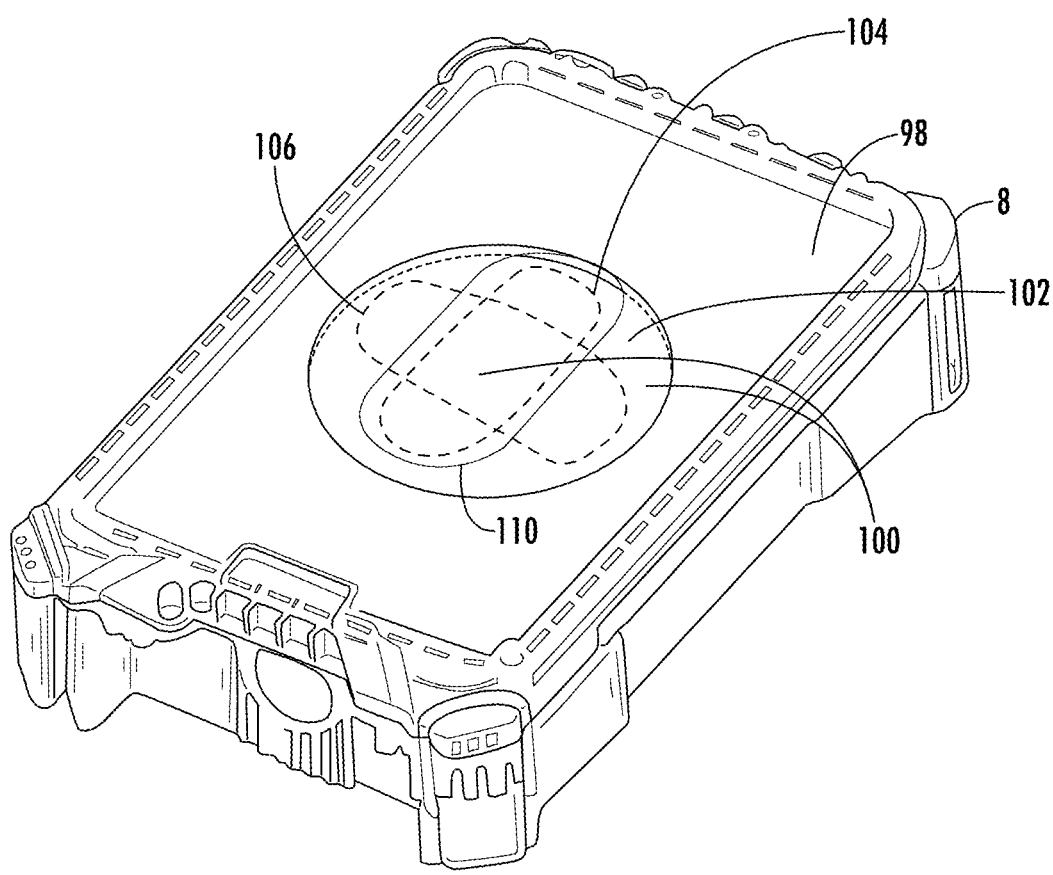
FIG. 10 is a perspective top view of the storage unit of FIG. 9, according to an exemplary embodiment.
Figure 11:
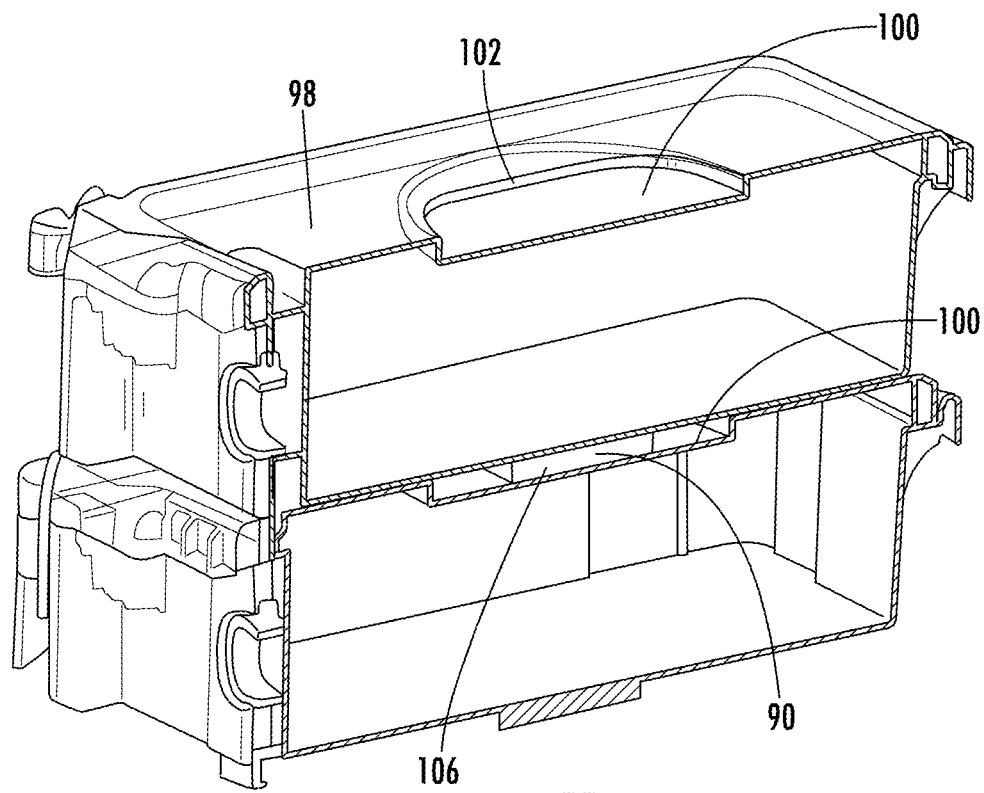
FIG. 11 is a perspective cross-sectional view of a storage unit, according to an exemplary embodiment.
Figure 12:
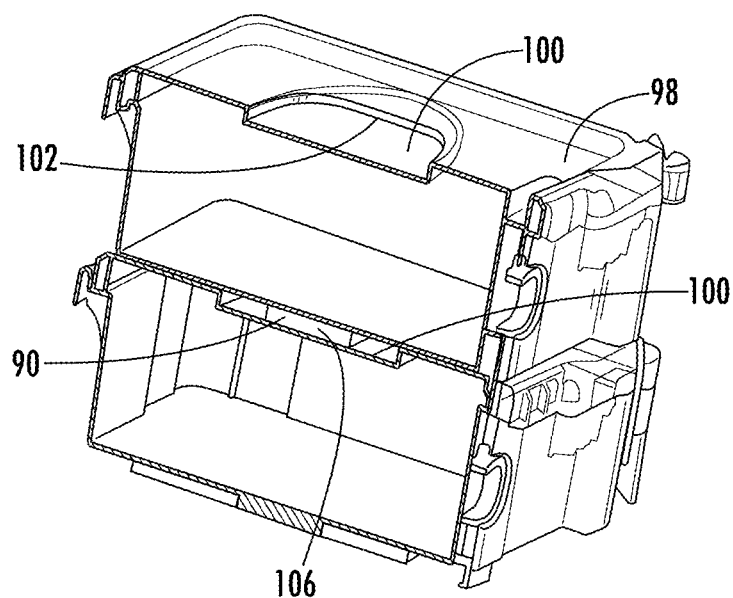
FIG. 12 is a perspective cross-sectional view of a storage unit, according to an exemplary embodiment.

FIG. 8 illustrates a lid of the boxes include raised tracks 80 along one direction, and have rails 82 running through and perpendicular to the tracks. The bottom of the box would include feet that engage the rails and secure the boxes in a direction orthogonal to the top and bottom surfaces of the boxes. The outside dimension of the feet can be about the same (slightly smaller) than the width between the tracks to prevent the boxes from sliding left and right (e.g., the direction of the axis of the rails). A sliding lock in the top box can engage one of the rails to prevent the boxes from sliding in the direction parallel to the tracks. Thus, once locked, the boxes would not move with respect to one another. One aspect of this concept that is beneficial is that the top and bottom boxes can be almost any dimensions and still engage one another. For example, in the example above, the lid can engage four red boxes. Also, the simplicity of the rails will make it easy to adapt other items to the box (e.g., items can be strapped or tied down using the rails).

Sliding lock 84 comprises a spring that biases sliding lock 84 towards rail 82 (from the perspective of FIG. 8). Feet 86 of top storage container 8 are engageably coupled to rails 82 as top storage container 8 is slid into and pivoted with respect to bottom storage container 8 (from the perspective of FIG. 8). Then, sliding lock 84 engages with rail 82. To decouple top storage container 8 from bottom storage container 8, sliding lock 84 is first decoupled from rail 82, thus permitting top storage container 8 to slide and pivot away from bottom storage container 8.

FIGS. 9-12 illustrate storage containers or boxes according to another embodiment. In general, this concept works by lowering the top box onto the bottom box while the two boxes are rotated 90° to one another. The oblong cleat passes through the oblong hole in the lid and into the circular inner recess. Then the boxes are rotated 90° to one another such that they are aligned (in the embodiment shown, the boxes are rectangular, but boxes could be square) and the oblong hole and the oblong cleat are 90° to one another. In this position, the latch engages with the latch receptacle to prevent the boxes from rotating with each other.

At bottom surface 94 of storage container 8, cleat 90 comprises body 108 and overhang 92 extending from either end 96 of cleat 90. Overhang 92 comprises a semi-circular shape and extends over bottom surface 94. To lock storage containers 8, cleat 90 from top storage container 8 is placed through opening 110 into depression 100 into unlocked position 104. Then, top storage container 8 and bottom storage container 8 are rotated 90 degrees with respect to each other until cleat 90 is rotated into locked position 106. In locked position 106, end 96 of cleat 90 is disposed between top surface 98 and locking plate 102. It is contemplated herein that cleat 90 and opening 110 may have any shape as would be understood by those skilled in the art (e.g., rectangular, triangle, etc.). It is also contemplated herein that storage containers 8 are rotated more or less than 90 degrees to lock cleat 90 within locking plate 102 (e.g., 30 degrees, 45 degrees, etc.).

Figure 13:
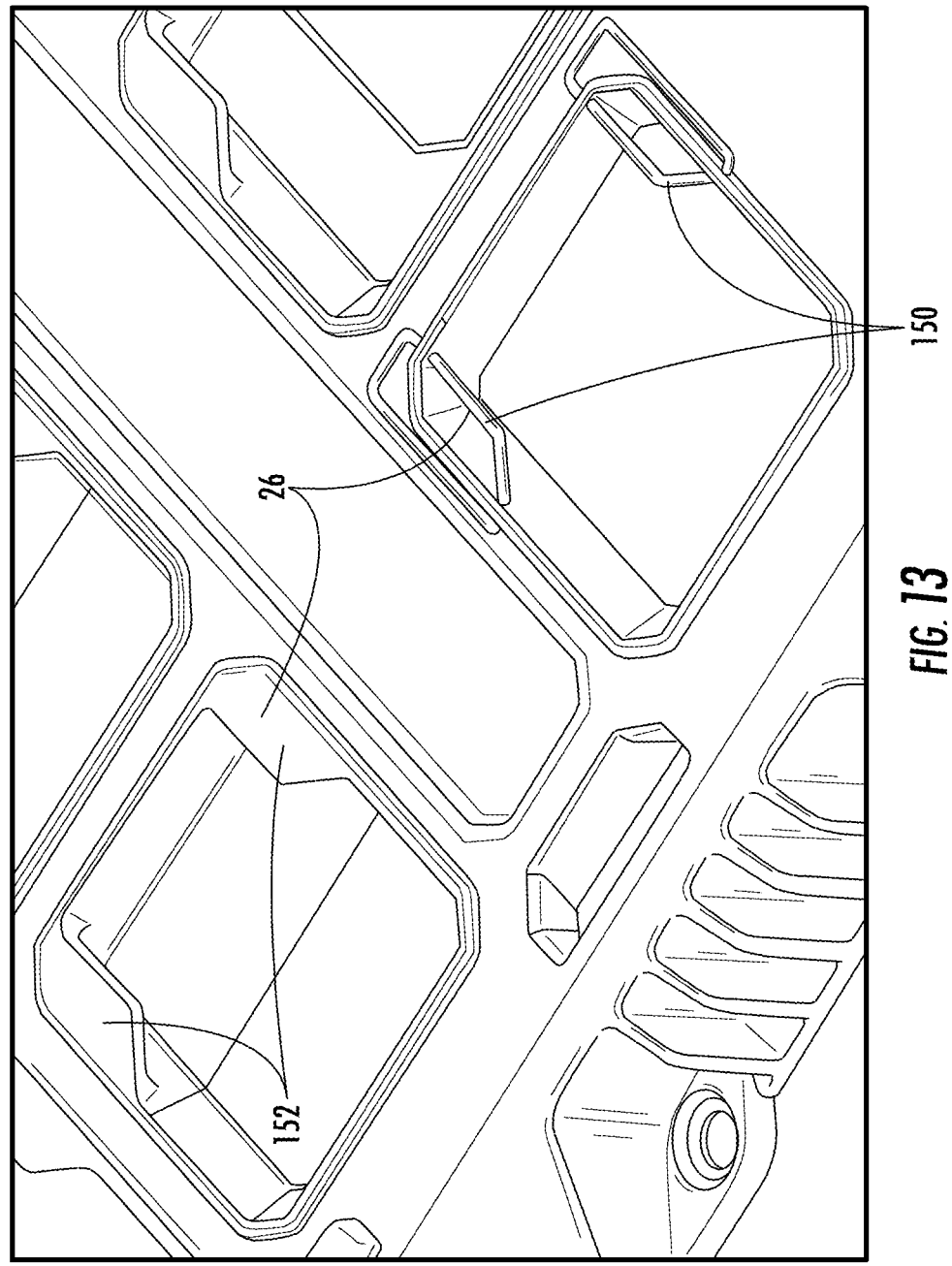
FIG. 13 is a perspective top view of a coupling component for a storage unit, according to an exemplary embodiment.

FIG. 13 illustrates a lid that includes uses a metal wire form 150 to create the fins in the female cleat receptacle (on the right of the image of FIG. 13) in place of the formed plastic fins (such as the fins 152 on the left receptacle in FIG. 13).

It is contemplated herein that wire 150 consists of any material that would provide sufficient strength to the coupling of storage containers 8 (e.g., plastic). It is also contemplated herein that wire 150 may be any shape beyond the two-sided shape depicted in FIG. 13 (e.g., a linear shape, a two-sided shape at a 90 degree angle with respect to each other, etc.).

Figure 14:
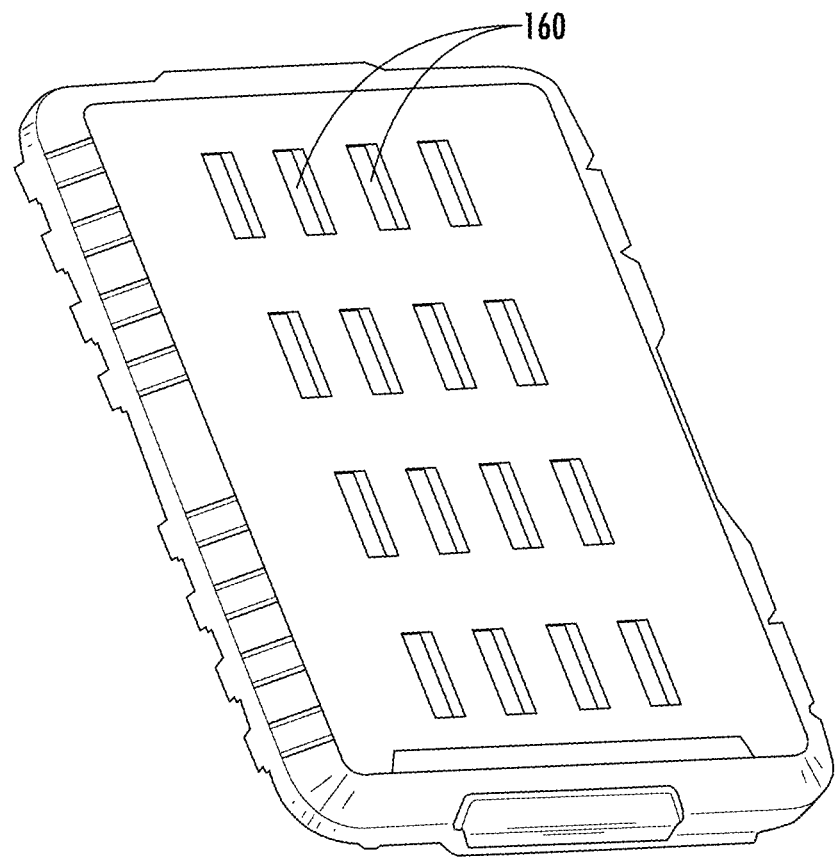
FIG. 14 is a perspective top view of female coupling components for a storage unit, according to an exemplary embodiment.
Figure 15:
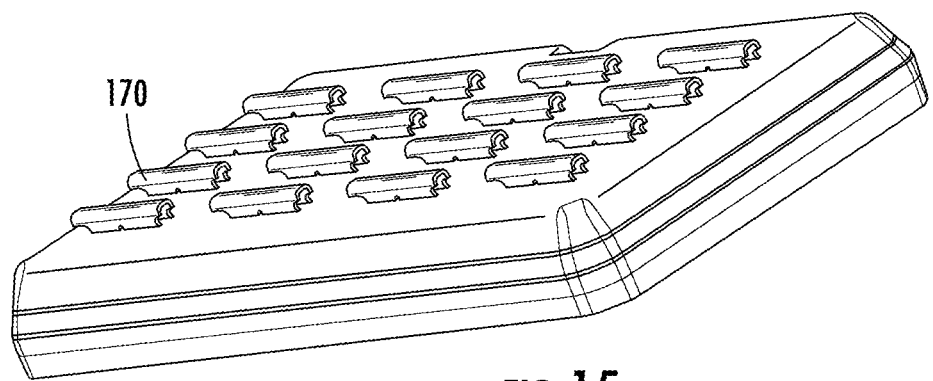
FIG. 15 is a perspective top view of male coupling components for a storage unit, according to an exemplary embodiment.

FIGS. 14 and 15 illustrate a lid and base that replaces the cleat and receptacle structures from the box discussed above with regard to FIG. 2 with E-track cleats and receptacles. FIG. 14 is the lid with the receptacles 160, and FIG. 15 is the base with the cleats 170.

It is contemplated herein that a wall (e.g., back wall of a pickup truck) comprises receptacles 160 and/or cleats 170 that engage with cleats 170 or receptacles 160, respectively.

Figure 16:
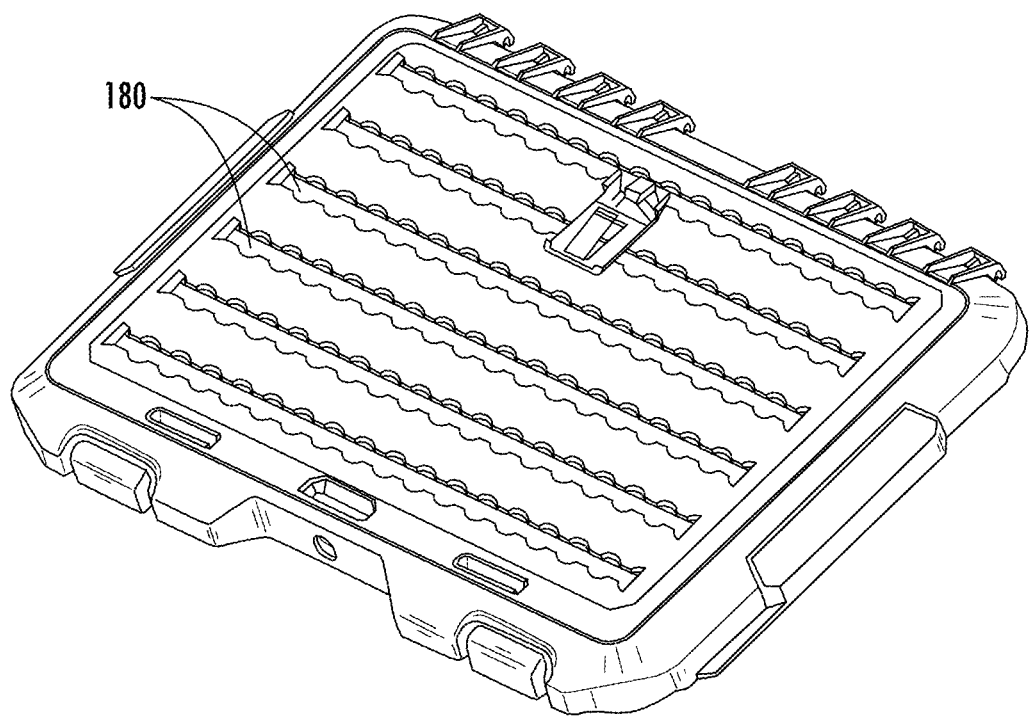
FIG. 16 is a perspective top view of female coupling components for a storage unit, according to an exemplary embodiment.
Figure 17:
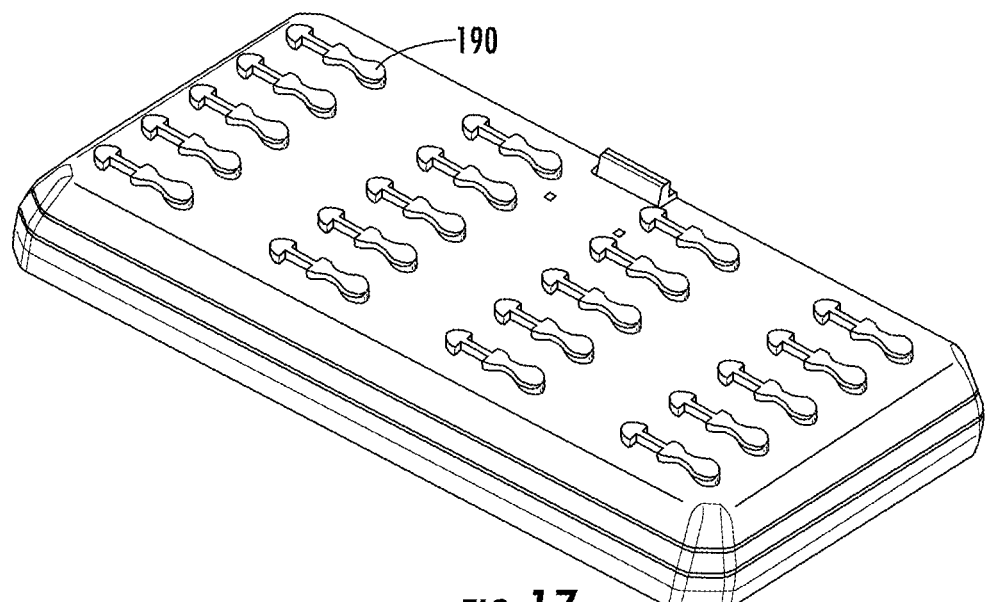
FIG. 17 is a perspective top view of male coupling components for a storage unit, according to an exemplary embodiment.

FIGS. 16 and 17 illustrated an alternative embodiment. This system includes L-track cleats and receptacles. FIG. 16 is the lid with the receptacles 180, and the FIG. 17 is the base with the cleats 190.

It is contemplated herein that a wall (e.g., back wall of a pickup truck) comprises receptacles 180 and/or cleats 190 that engage with cleats 190 or receptacles 180, respectively.

Figure 18:
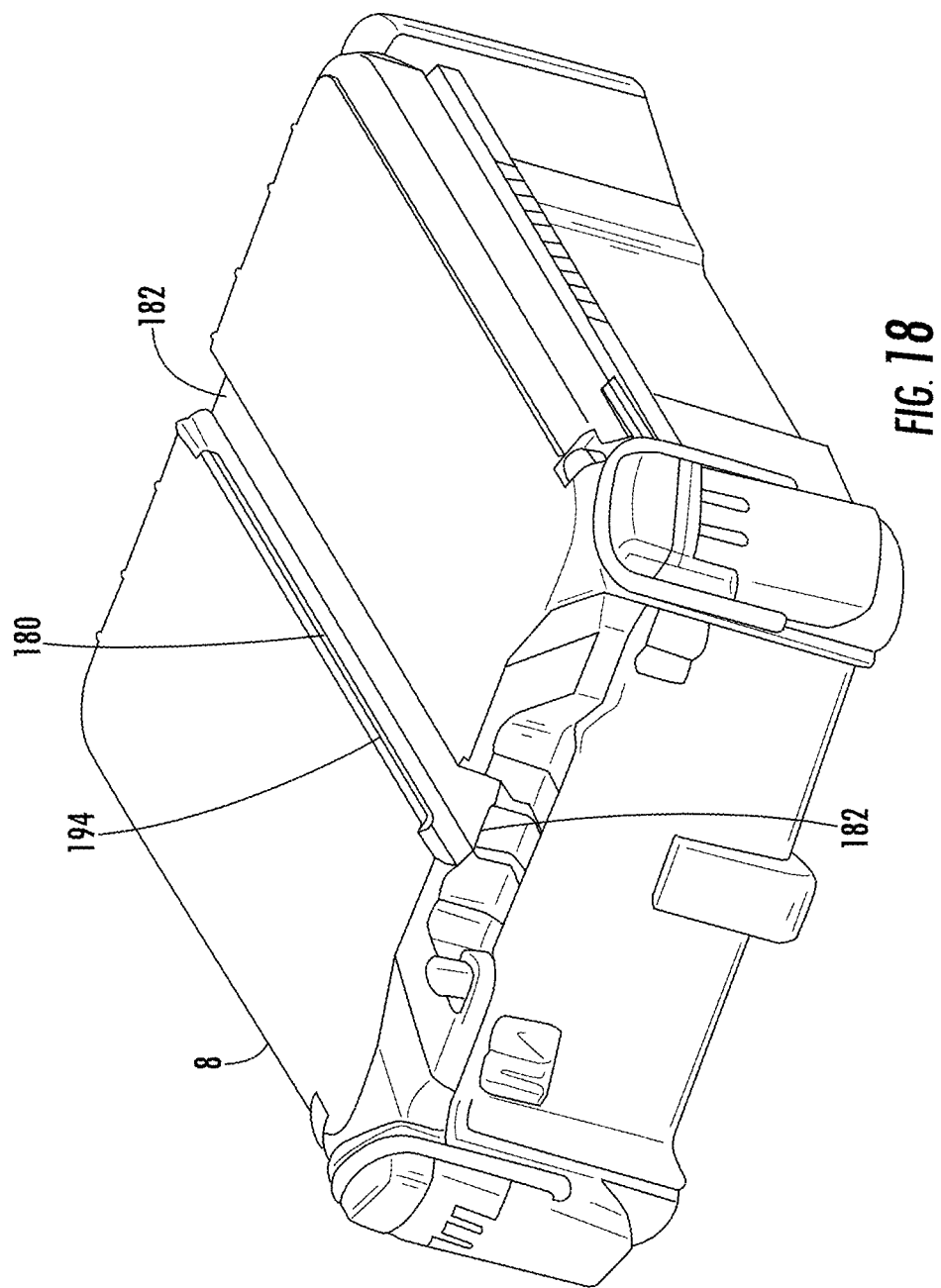
FIG. 18 is a perspective top view of a storage unit, according to an exemplary embodiment.
Figure 19:
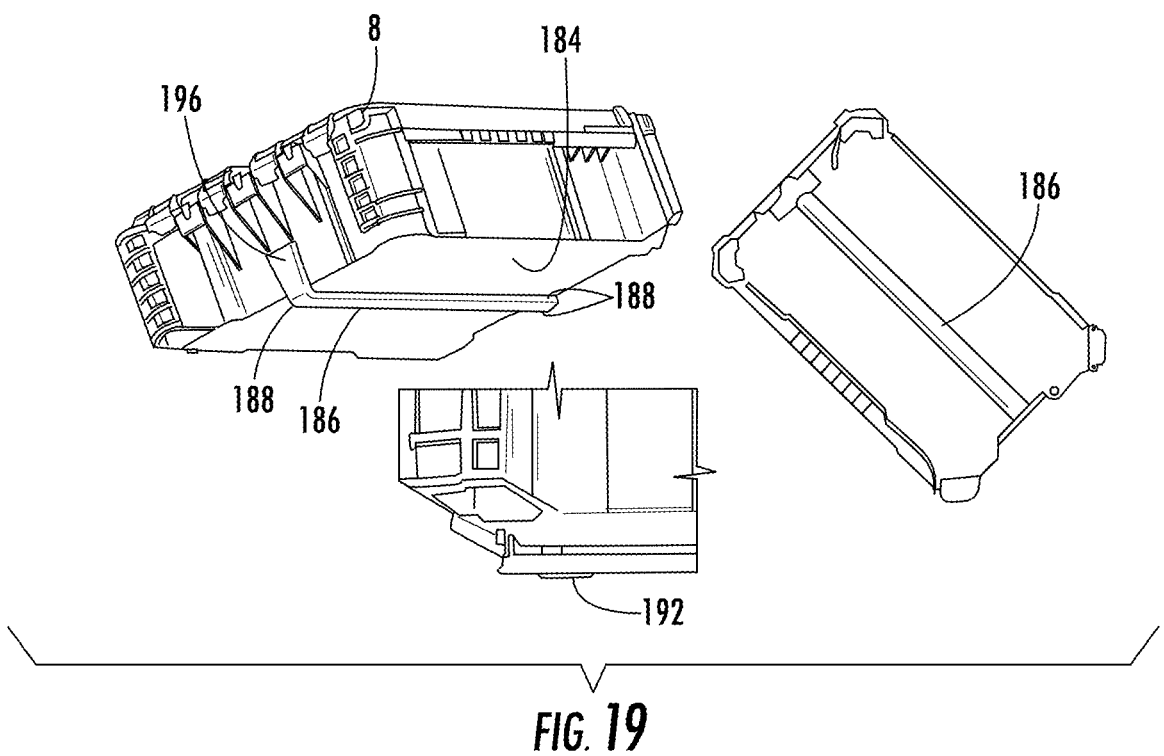
FIG. 19 is several views of a storage unit that interfaces with the storage unit of FIG. 18, according to an exemplary embodiment.

FIGS. 18-19 illustrate an alternative embodiment. This concept includes a center channel and rail system. The channel has ends that are wider than the main portion of the channel. Similarly, the rail has tabs at the end that are as wide as the wide end to secure the rail within the channel and has a bump on an upper surface of the rail that engages with the wide end of the channel. The rail includes a spring loaded portion that allows the two pieces to be disconnected from one another.

Bottom storage container 8 comprises receptacles 180, shown as channel 180, defined by wall 194 with ends 182. Top storage container 8 includes rail 186 with protrusions 188 extending laterally from rail 186. Button 196 is pressed causing protrusions 188 to retract towards rail 186, allowing rail 186 to be placed within channel 180. Button 196 is then released allowing protrusions 188 to laterally extend from rail 186 within channel 180. Bump 192 engages channel 180 at end 182 to interface channel wall 194

Figure 20:
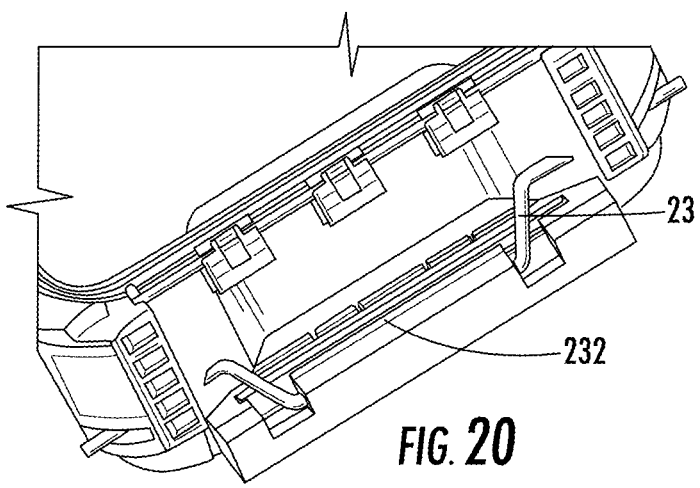
FIG. 20 is a perspective view of a coupling component of a storage unit, according to an exemplary embodiment.
Figure 21:
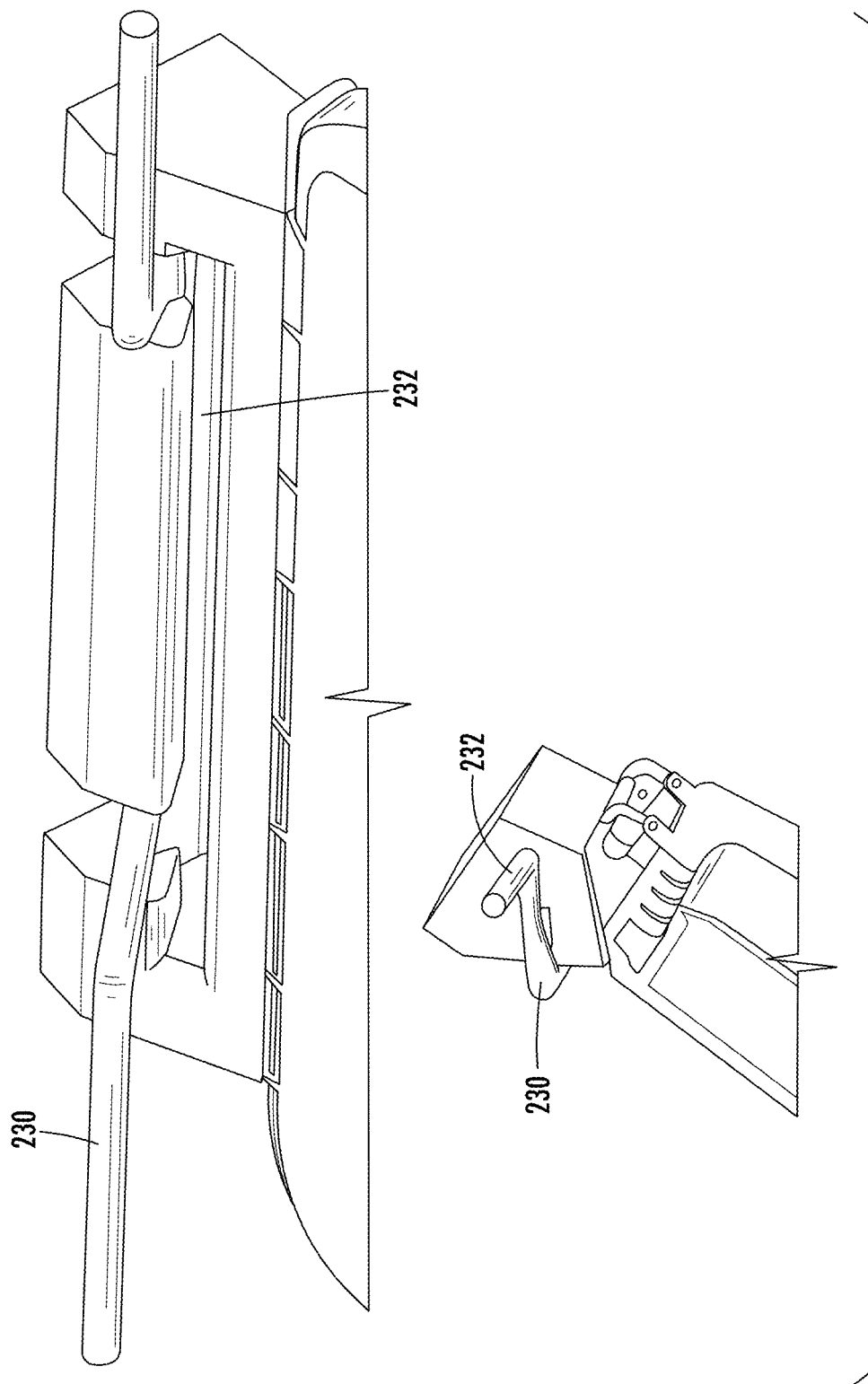
FIG. 21 is several perspective views of a storage unit that interfaces with the storage unit of FIG. 20, according to an exemplary embodiment.
Figure 22:
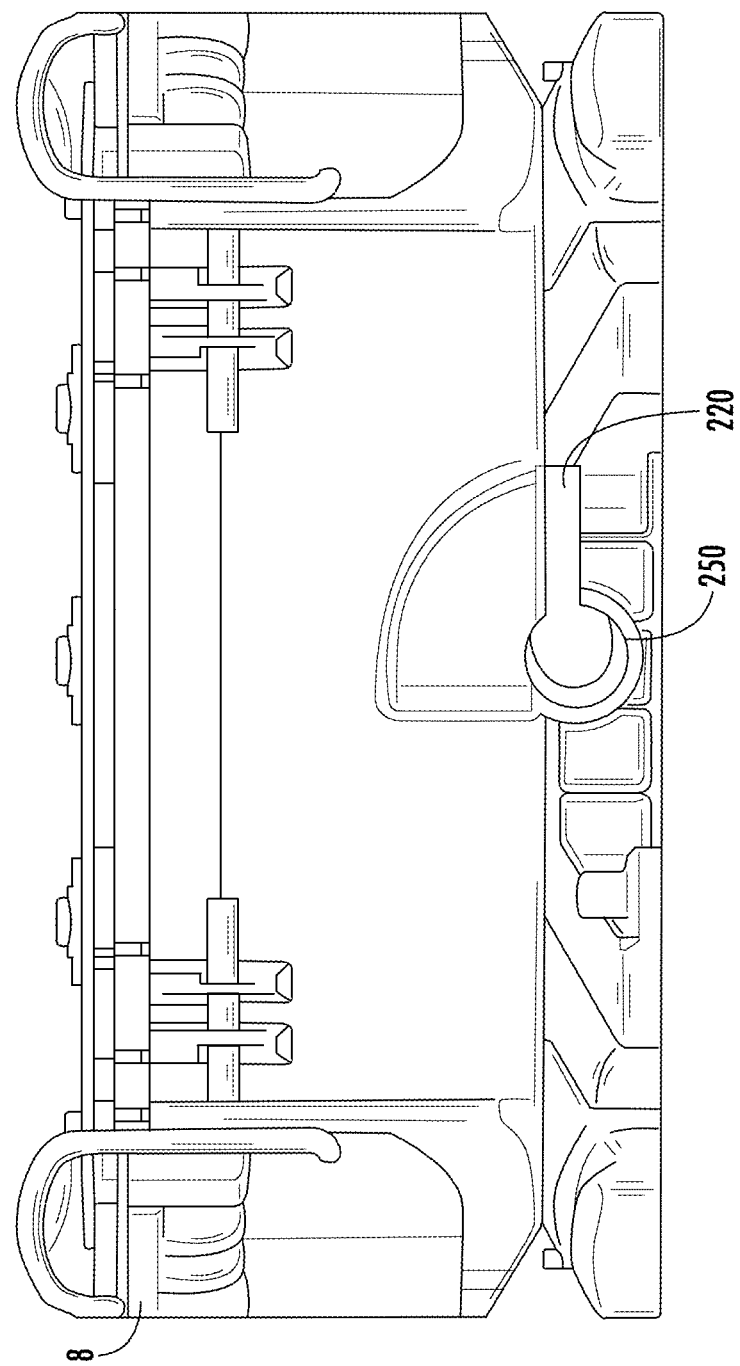
FIG. 22 is a perspective side view of a storage unit, according to an exemplary embodiment.
Figure 23:
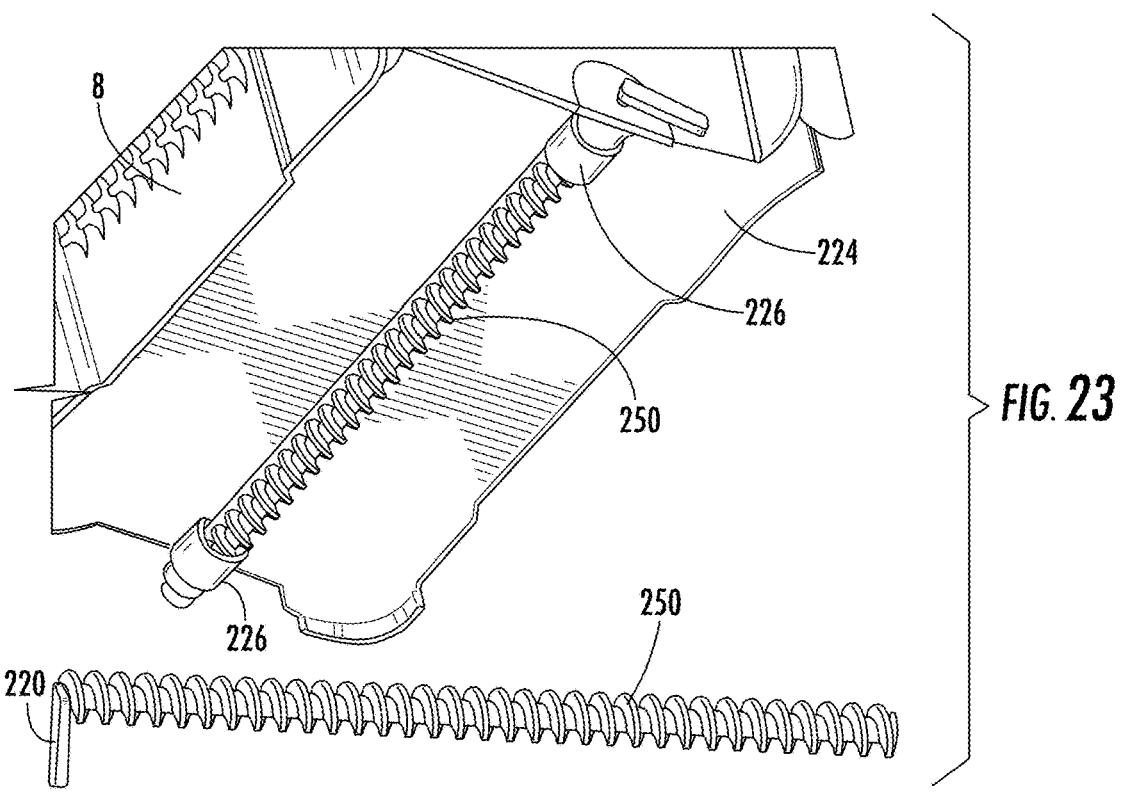
FIG. 23 is a perspective view of the coupling component of the storage unit of FIG. 22, according to an exemplary embodiment.
Figure 24:
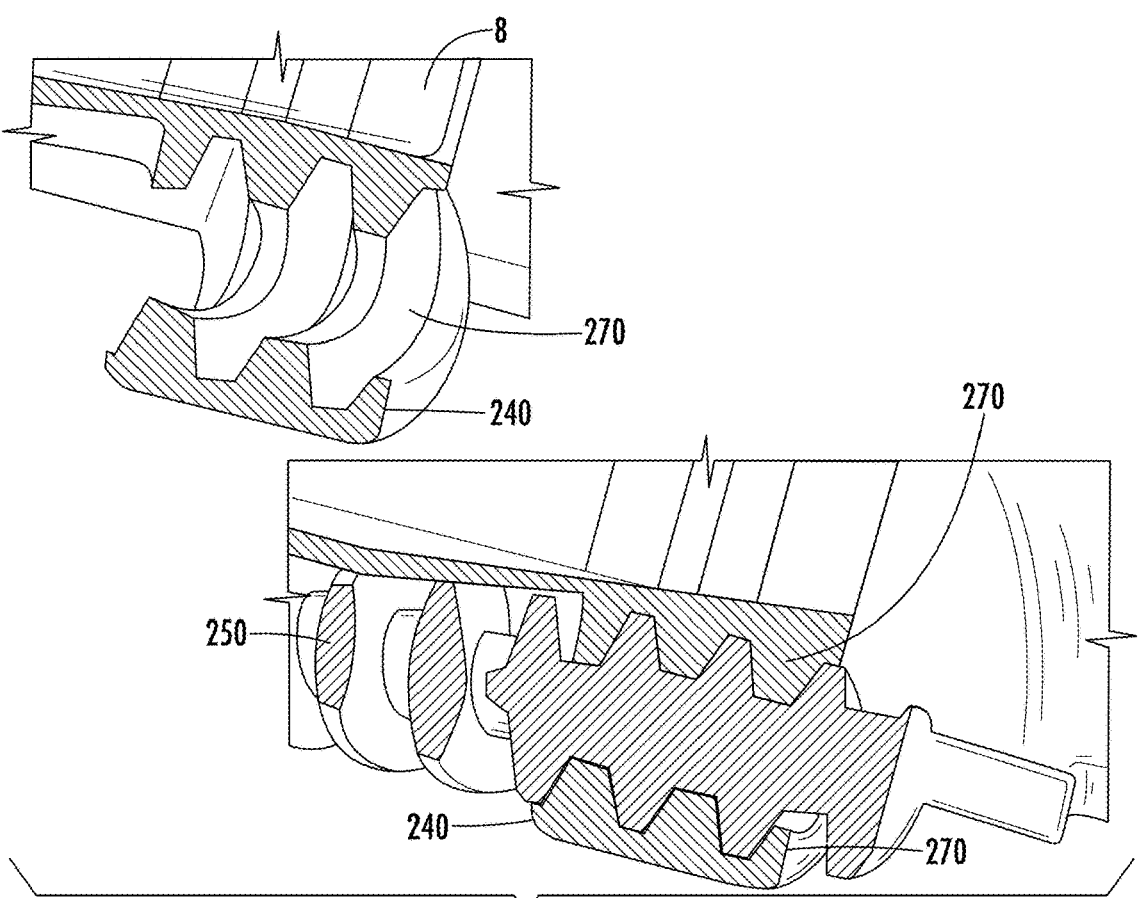
FIG. 24 is several views of the storage unit of FIG. 22, according to an exemplary embodiment.
Figure 25:
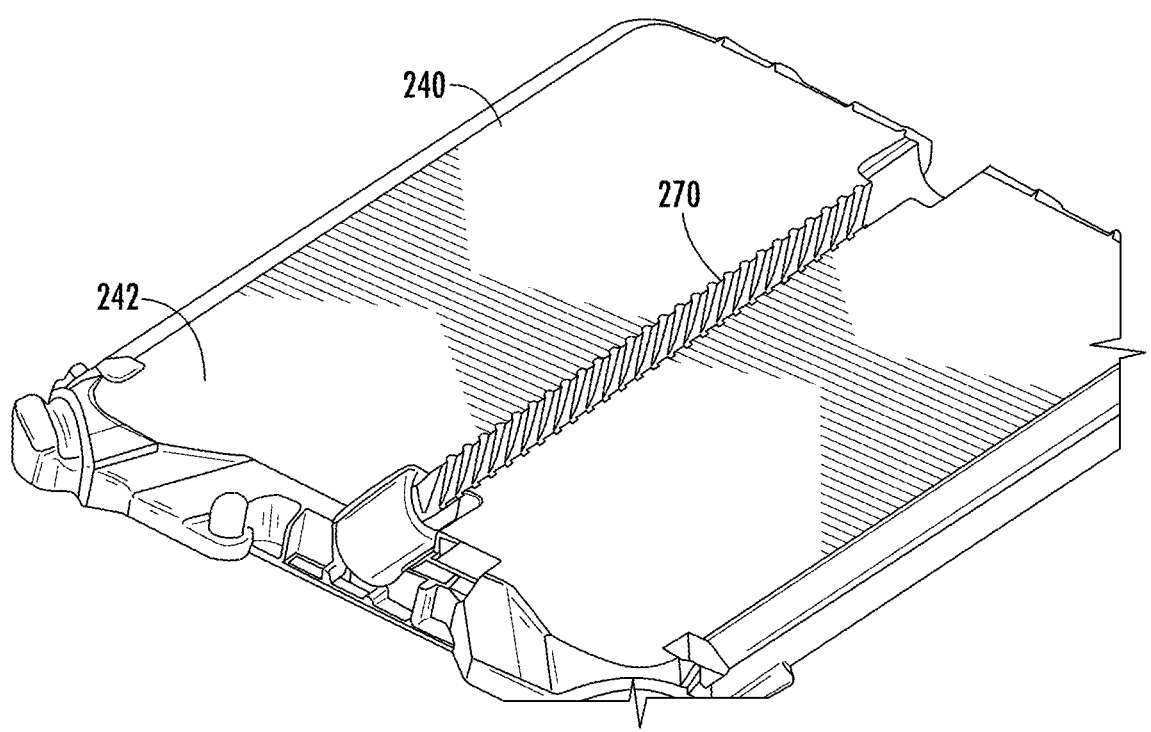
FIG. 25 is a perspective top view of a storage unit that interfaces with the storage unit of FIG. 22, according to an exemplary embodiment.
Figure 26:
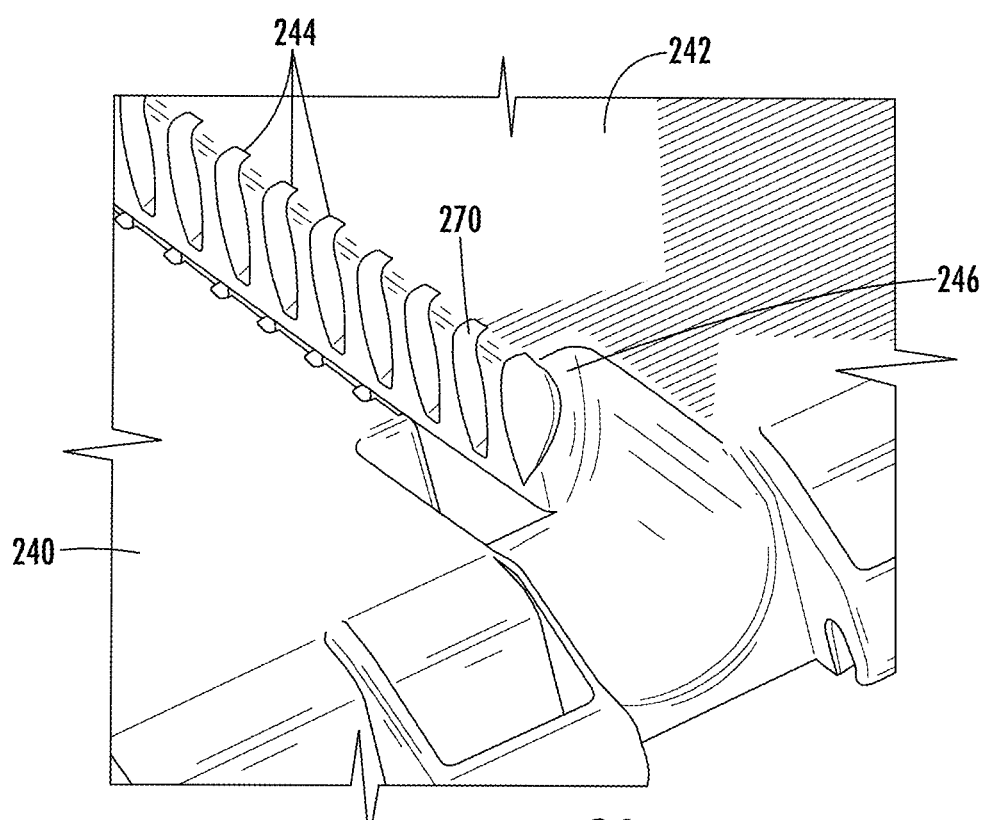
FIG. 26 is a perspective top view of a storage unit that interfaces with the storage unit of FIG. 22, according to an exemplary embodiment.

FIGS. 20 and 21 illustrates an alternative embodiment. The top box includes a metal rail 230 that engages with a receptacle 232 on the bottom box. The metal rail and receptacle are on one end of the system, and the other end would be secured using a latch, a buckle, a lock, etc.

Rail 230 is pivotably engaged to top storage container 8. Rail 230 is rotated to selectively engage with receptacle 232 on bottom storage container 8.

FIGS. 22-26 illustrate an alternative embodiment. This concept uses a helical screw 250 design to engage the two pieces. The screw 250 is mounted to the bottom of a box at both ends of the screw, and the center section is free to engage with corresponding helical receptacles 270 (FIG. 25) in the lid. Once the two pieces are mated (e.g., the box is placed on top of the lid), the screw can be turned one quarter of a turn by the knob to engage the threads in the helical receptacles. There is enough engagement that the screw would be locked within the helical receptacle such that the two pieces would not come apart.

Screw 250 rotates within cylinders 226, shown as tubular structures, which are affixed to either end of storage container 8 along the longitudinal axis of screw 250. A user engages lever 220 to rotate screw 250. To couple top storage container 8 and bottom storage container 240, top storage container 8 is placed above bottom storage container 240 and screw 250 is placed within threaded receptacle 270. After screw 250 is rotated (e.g., 90 degrees of rotation) then screw 250 is displaced within threaded receptacle 270 such that screw 250 can no longer be removed from threaded receptacle without counter-rotating screw 250 into the unlocked position.

In one embodiment, screw 250 and threaded receptacle 270 are locked by virtue of threaded receptacle 270 including multiple threaded apertures 244 that are angled (e.g., non-perpendicular, in this context) with respect to top surface 242 of bottom storage container 240. In the locking position, engagement screw 250 cannot be slid from threaded receptacle 270 because cylinder 226 of top storage container 8 interfaces against locking surface 246, thereby preventing lateral sliding of top storage container 8 with respect to bottom storage container 240.

Figure 27:
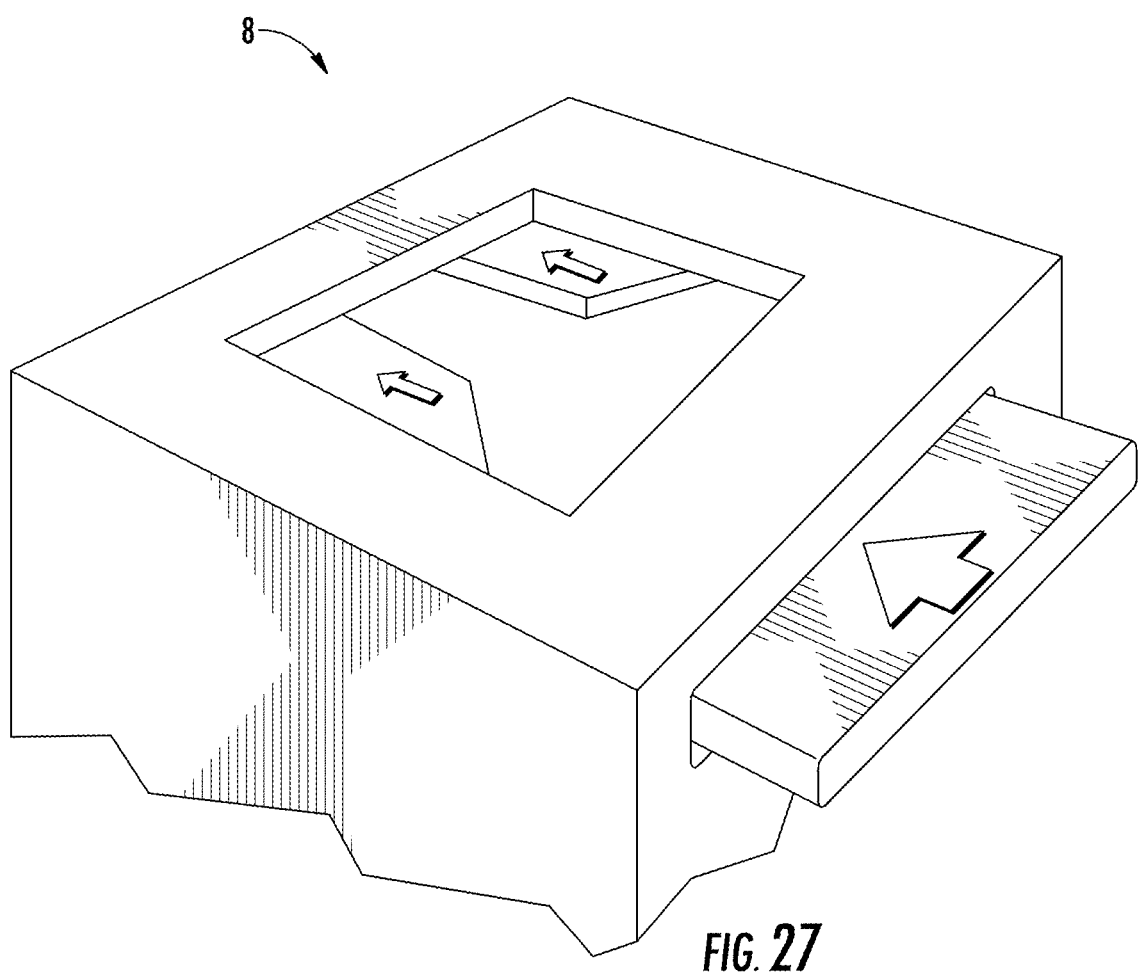
FIG. 27 is a perspective top view of a storage unit, according to an exemplary embodiment.
Figure 28:
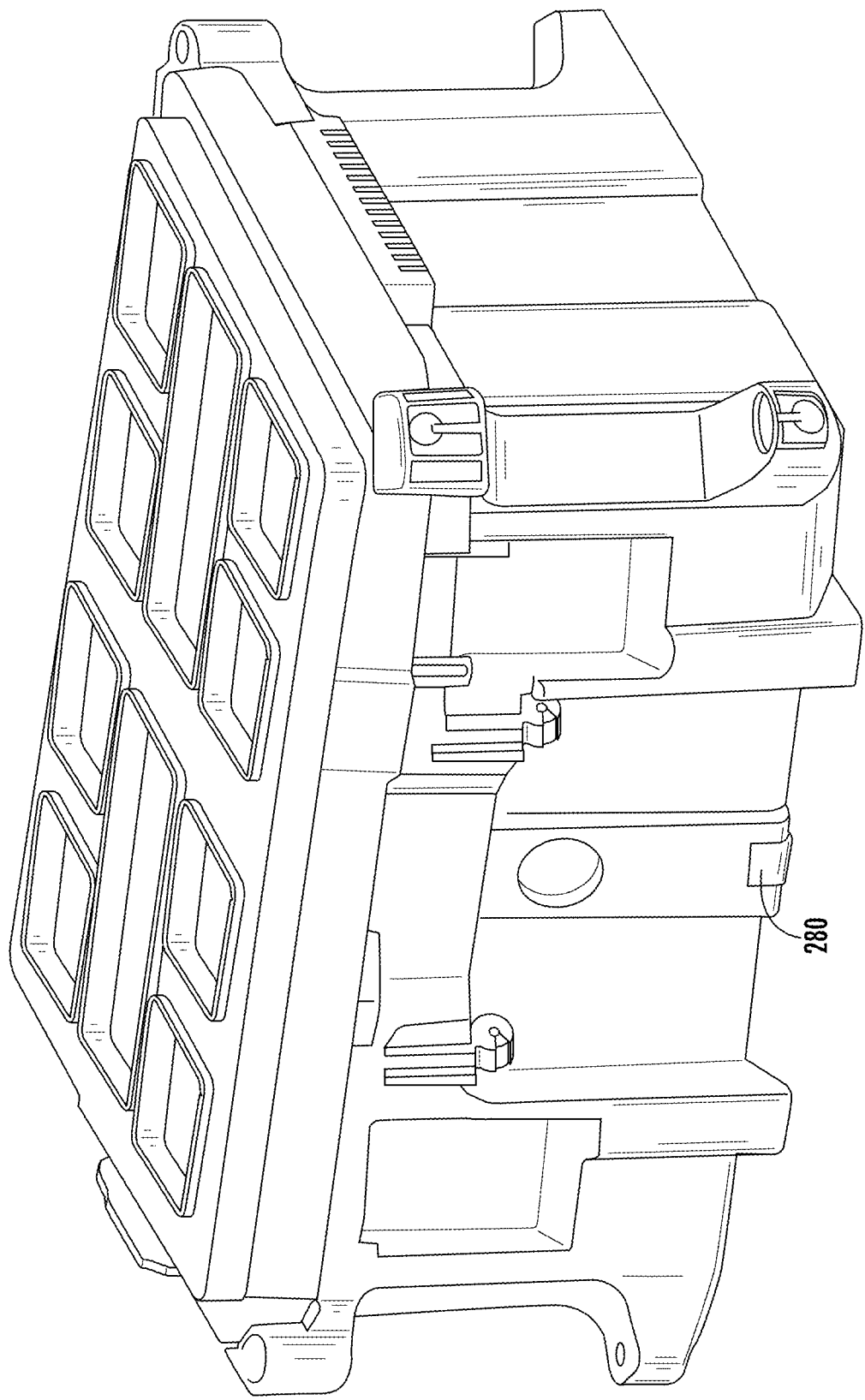
FIG. 28 is a perspective view of a storage unit, according to an exemplary embodiment.

FIG. 27 illustrates an alternative embodiment of a locking mechanism. The fins or tabs of the female receptacle slide in and out to selectively lock the male cleat. The male cleat is similar to cleat of FIG. 4, but would have the same length and width as the female receptacle such that the two pieces would not slide along in the same direction that the fins move. That is, once the fins are retracted, the top box could be lifted off in the vertical direction, but the two boxes would not slide in a horizontal direction. Ribs are attached to front lever. The ribs retract and the top box can come in from the top. Than the ribs will pop back out and lock the box in. The ribs can be spring loaded and ramped so that the other box will snap in and all you have to do is push in the front lever to disengage the ribs.

FIGS. 28-34 illustrate an alternative embodiment of a tool storage container that can be attached to multiple containers. Attached to the unlocking button is a steel frame 310 that passes through the male cleats 320 that have the locking levers 312, 314. The locking levers can include the pivot style 312 and/or a wedge style 314. In the unlocked position (FIG. 29), the top box would be able to be lifted off of the bottom, and the two boxes would not slide in the horizontal position with respect to one another. Although not shown, the male cleats would be longer to fill out the depressions in the female receptacle. In one embodiment, either one may be used. The pivot style 312 has a bar that pivots from an extended position (locked—FIG. 30) that engages the female rib to a retracted position that moves out of the way from the female rib. The wedge style has a wedge shape that, when the top box is pushed down onto and into the bottom box, the wedge moves inward (away from the female rib) and moves the steel frame until the wedge passes by the female rib when the wedge extends and locks the boxes in place.

Figure 29:
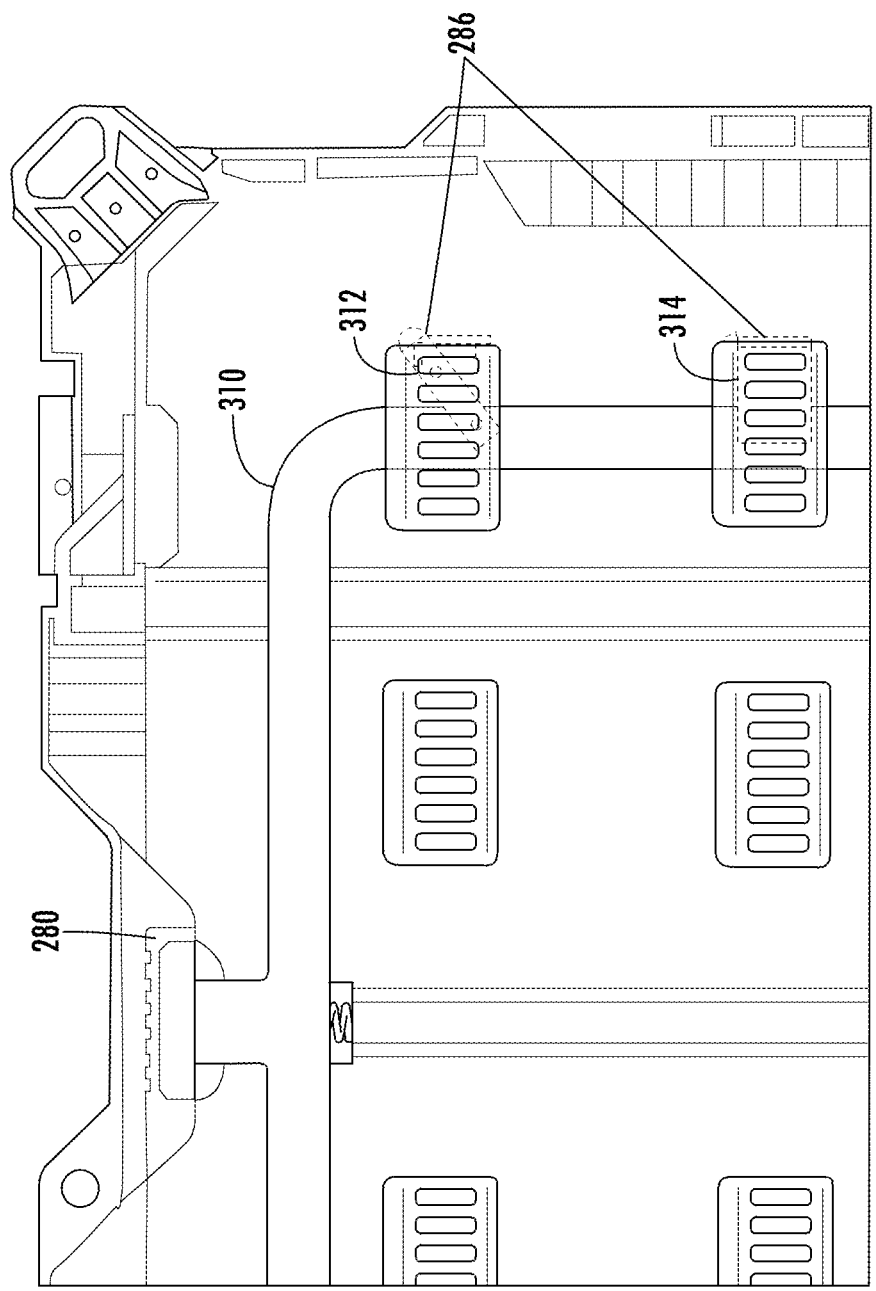
FIG. 29 is a bottom view of a coupling system of a storage unit in an unlocked position, according to an exemplary embodiment.
Figure 30:
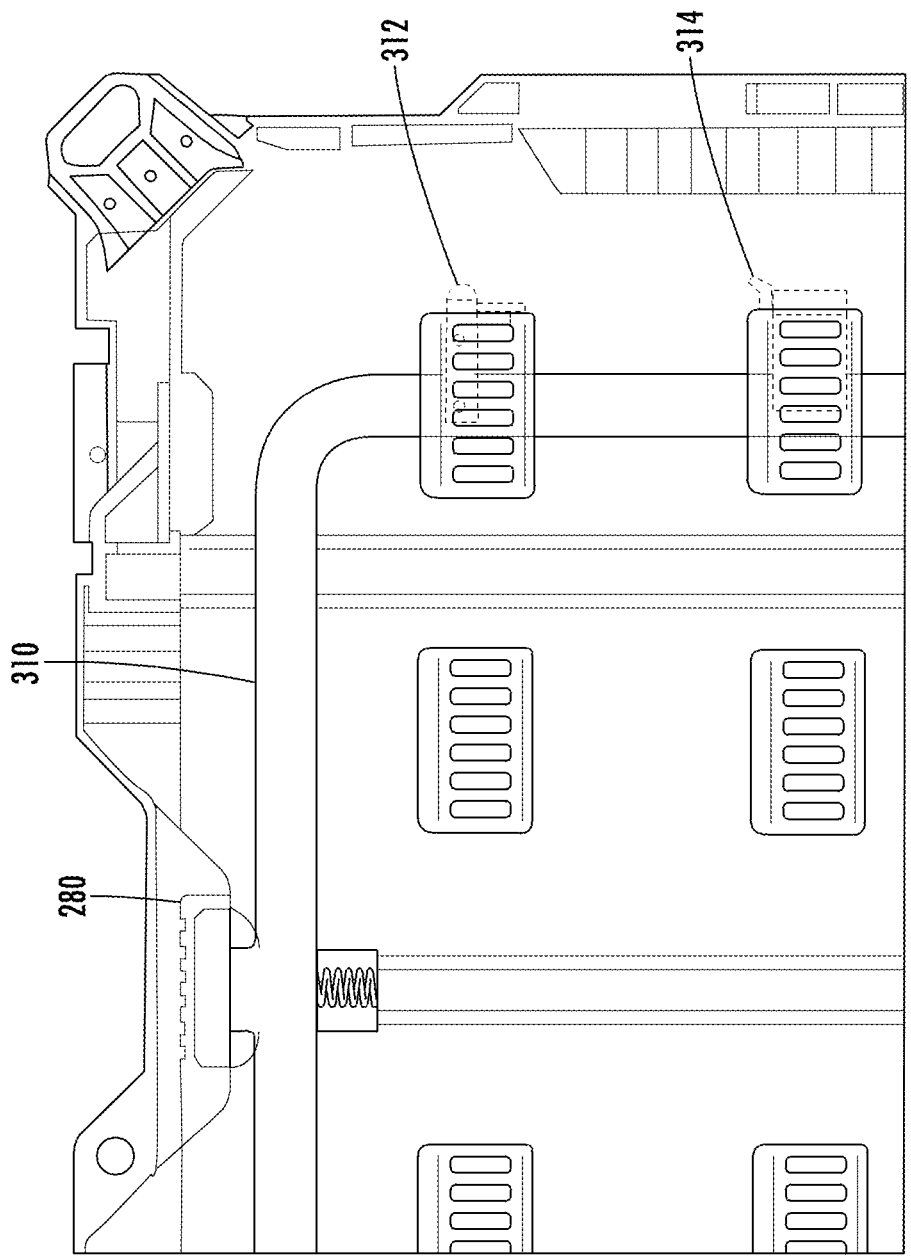
FIG. 30 is a bottom view of a coupling system of a storage unit in a locked position, according to an exemplary embodiment.
Figure 31:
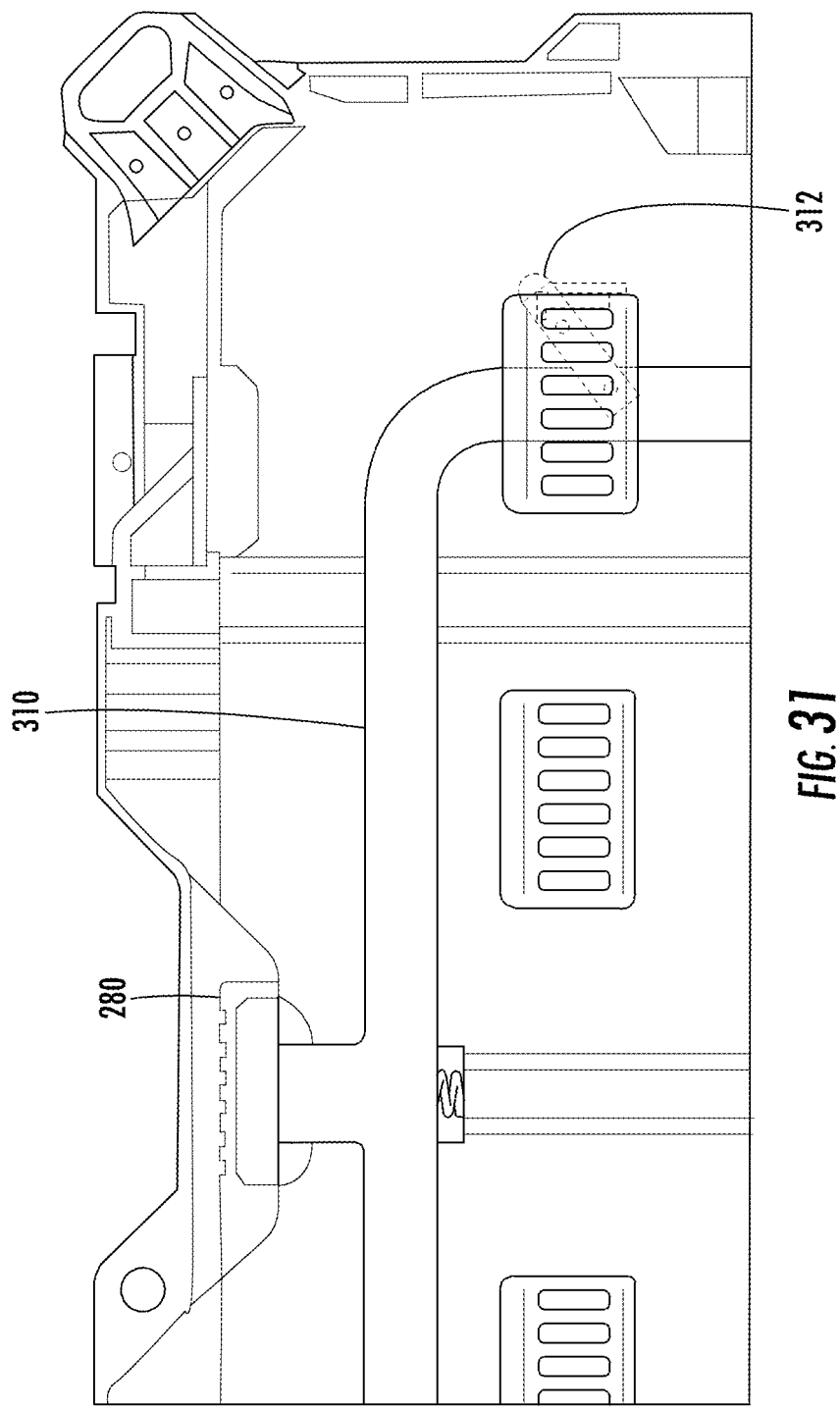
FIG. 31 is a bottom view of a coupling system of a storage unit in an unlocked position, according to an exemplary embodiment.
Figure 32:
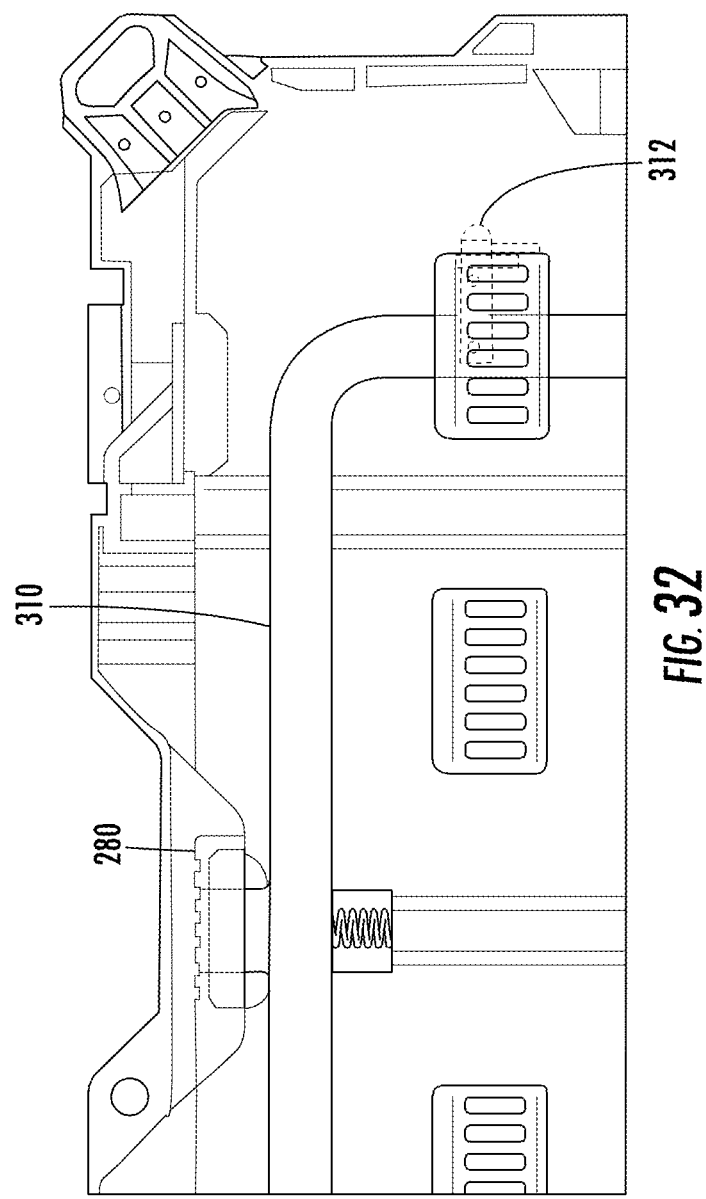
FIG. 32 is a bottom view of a coupling system of a storage unit in a locked position, according to an exemplary embodiment.
Figure 33:
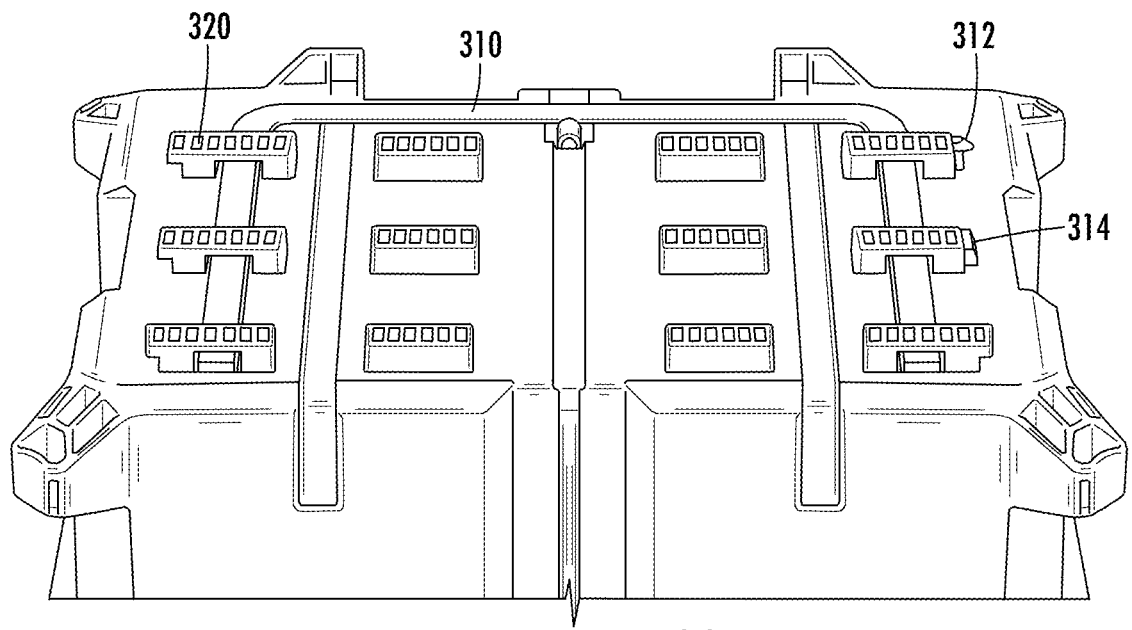
FIG. 33 is a perspective view of a storage unit with the coupling systems of FIGS. 28-32, according to an exemplary embodiment.
Figure 34:
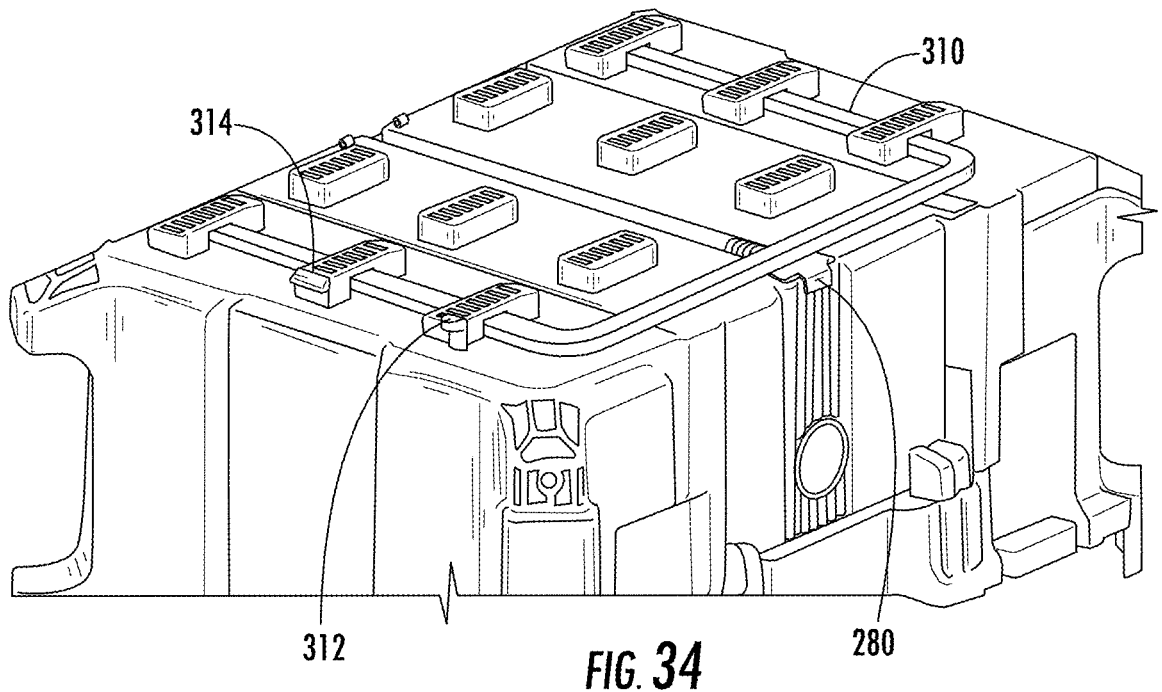
FIG. 34 is a perspective view of a storage unit with the coupling systems of FIGS. 28-32, according to an exemplary embodiment.

Locking button 280 is spring-loaded so pivot-style locking lever 312 and wedge-style locking lever 314 are extended (best shown in FIGS. 30 and 32) or retracted (best shown in FIGS. 29 and 31). Locking button 280 is biased by spring so that pivot-style locking lever 312 and wedge-style locking lever 314 are extended in the locking position (FIGS. 30 and 32). In one embodiment frame 310 has protrusions and recesses that cause the pivot (e.g., pivot-style lever 312) and the wedge (e.g., wedge-style lever 314) to alternately retract or extend from cleat 286.

It is contemplated herein that frame 310 may comprise multiple frames 310 and locking buttons 280 (e.g., one per each row of retractable cleats 286). It is also contemplated herein that tool storage container 8 may comprises any combination of pivot-style levers 312, wedge-style levers 314, and male cleats 320, including without limitation all or none of any of lever 312, lever 314, and male cleat 320.

FIGS. 35-40 illustrate alternative embodiments of tool storage containers that can be attached to multiple containers.

Figure 35:
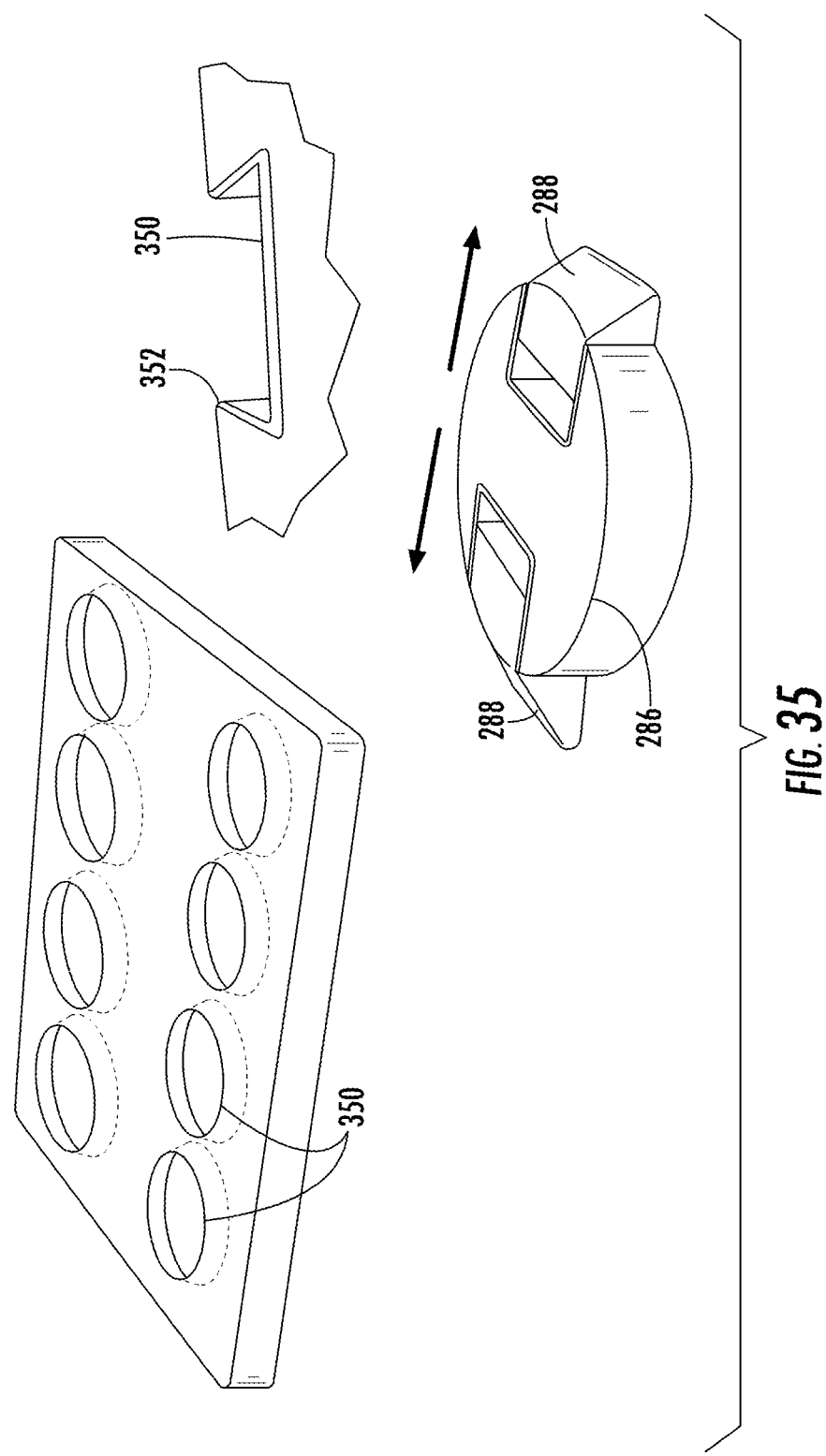
FIG. 35 is several views of a coupling system for a storage unit, according to an exemplary embodiment.

FIG. 35 depicts retractable cleats 286 with retractable extensions 288. Retractable extensions 288 are biased (e.g., spring-biased) to protrude from retractable cleats 286. Retractable cleats 286 are configured to selectively engage with apertures 350. Aperture 350 comprises opening 352 that is less wide than base 354. When retractable cleat 286 is initially placed within aperture 350, opening 352 forces retractable extension 288 into retractable cleat 286. As retractable cleat 286 is fully disposed within aperture 350, retractable extension 288 fully extends from retractable cleat 286.

Figure 36:
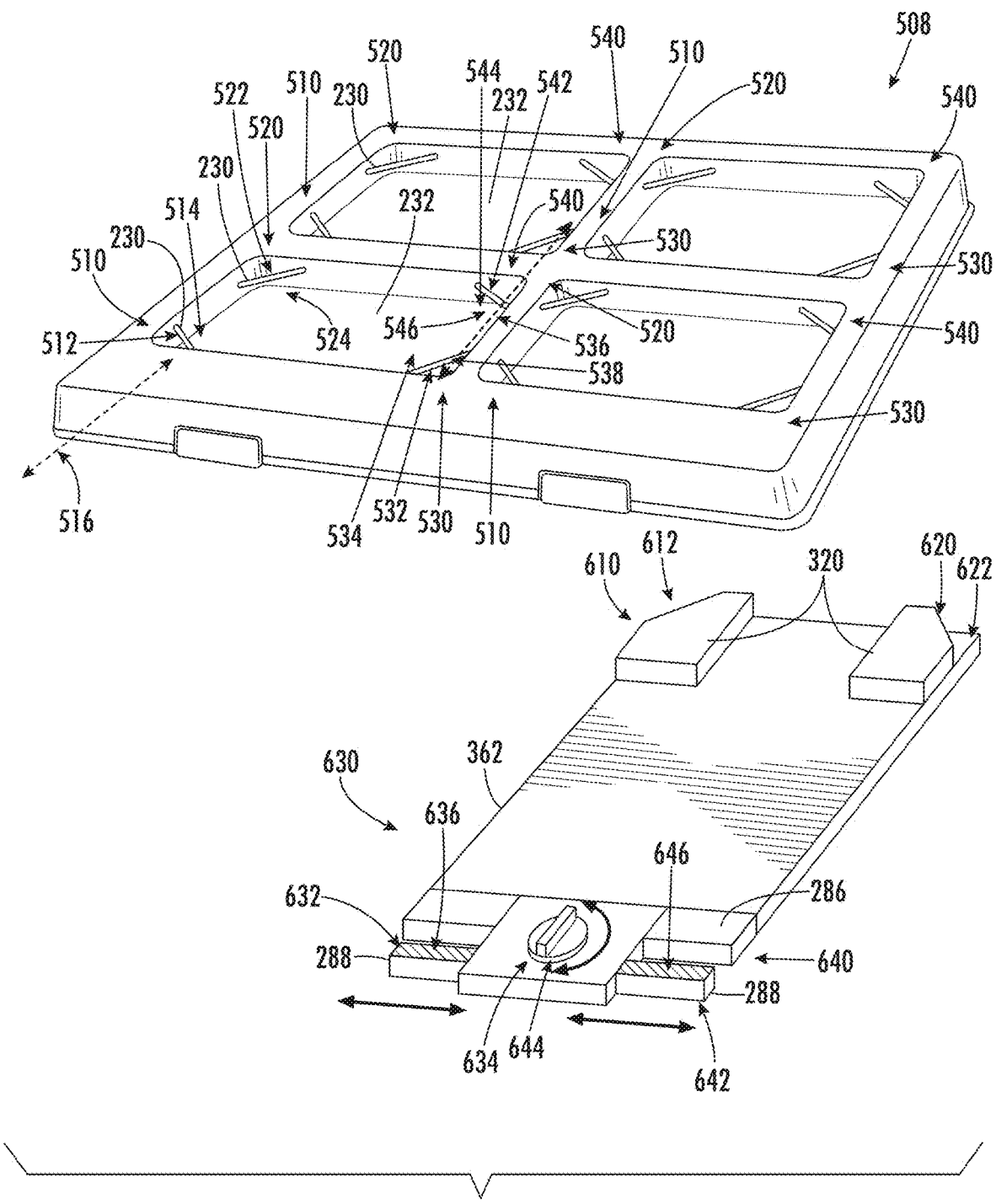
FIG. 36 is several perspective views of a coupling system for a storage unit, according to an exemplary embodiment.

FIG. 36 depicts another embodiment of retractable cleat 286. Top storage container 362 comprises male cleats 320 with permanent extensions, and retractable cleats 286, comprising retractable extensions 288, which are shown as retractable bars 288. Knob 360 is rotated to retract retractable extensions 288 within retractable cleat 286. Knob and retractable extensions 288 are spring-biased to a default position of retractable extensions 288 extending from retractable cleat 286. To engage top storage container 362 with rails 230, retractable extensions 288 are retracted within retractable cleats 286 by turning knob 360, male cleats 320 and retractable cleats 286 are coupled to rails 230 within receptacles 232, and knob 360 is released allowing the spring-loading bias to extend retractable extensions 288 thereby engaging rails 230.

In various embodiments, a container assembly includes a first container and a second container. The first container includes a first rear female coupler 510 configured at a top face 508 of the first container, the first rear female coupler 510 including a first rib 512 extending above a first coupling surface 514, a second rear female coupler 520 configured at the top face 508 of the first container, the second rear female coupler 520 including a second rib 522 extending above a second coupling surface 524, a first front female coupler 530 configured at the top face 508 of the first container, the first front female coupler 530 including a third rib 532 extending above a third coupling surface 534, and a second front female coupler 540 configured at the top face 508 of the first container, the second front female coupler 540 including a fourth rib 542 extending above a fourth coupling surface 544. In various embodiments, the first rear female coupler 510 and the second rear female coupler 520 are arranged in a first row 516 along the top face 508 of the first container. In various embodiments, the first front female coupler 530 and the second front female coupler 540 are arranged in a second row 536 closer to a front of the first container than the first row 516.

The second container includes a first rear male coupler 610 extending from the second container, the first rear male coupler 610 including a first tongue 612 engageable with the first rib 512 such that the first tongue 612 engages between the first rib 512 and the first coupling surface 514, wherein attaching engagement between the second container and the first container takes place when the first tongue 612 and the first rib 512 are engaged, thereby restricting separation between the second container and the first container. The second container further includes a second rear male coupler 620 extending from the second container, the second rear male coupler 620 including a second tongue 622 engageable with the second rib 522 such that the second tongue 622 engages between the second rib 522 and the second coupling surface 524, wherein attaching engagement between the second container and the first container takes place when the second tongue 622 and the second rib 522 are engaged, thereby restricting separation between the second container and the first container.

The second container further includes a first front male coupler 630 extending from the second container, the first front male coupler 630 including a first retractable tongue 632 engageable with the third rib 532 such that the first retractable tongue engages 632 between the third rib 532 and the third coupling surface 534, the first retractable tongue 632 actuating between a locked position (FIG. 36) and an unlocked position, wherein attaching engagement between the second container and the first container takes place when the first retractable tongue 632 and the third rib 532 are engaged when the first retractable tongue 632 is in the locked position thereby restricting separation between the second container and the first container. The second container further includes a second front male coupler 640 extending from the second container, the second front male coupler 640 including a second retractable tongue 642 engageable with the fourth rib 542 such that the second retractable tongue 642 engages between the fourth rib 542 and the fourth coupling surface 544, the second retractable tongue 642 actuating between a locked position (FIG. 36) and an unlocked position, wherein attaching engagement between the second container and the first container takes place when the second retractable tongue 642 and the fourth rib 542 are engaged when the second retractable tongue 642 is in the locked position thereby restricting separation between the second container and the first container. In various embodiments, disengaging the second container from the first container can be performed after actuating each of the first retractable tongue 632 and the second retractable tongue 642 to the unlocked position.

In various embodiments, actuating the first retractable tongue 632 from the locked position to the unlocked position involves a portion 634 of the first front male coupler 630 rotating with respect to the second container. In various embodiments, actuating the second retractable tongue 642 from the locked position to the unlocked position involves a portion 644 of the second front male coupler 640 rotating with respect to the second container.

In various embodiments, the first retractable tongue 632 defines a first upper surface 636 that interfaces against a first bottom surface 538 of the third rib 532 to restrict separation between the second container and the first container when the first retractable tongue 632 and the third rib 532 are engaged. In various embodiments, the second retractable tongue 642 defines a second upper surface 646 that interfaces against a second bottom surface 546 of the fourth rib 542 to restrict separation between the second container and the first container when the second retractable tongue 642 and the fourth rib 542 are engaged.

In various embodiments, the first tongue of the first rear male coupler 610 is rigidly coupled to the second container, and the second tongue 622 of the second rear male coupler 620 is rigidly coupled to the second container. In various embodiments, each of the first retractable tongue 632 and the second retractable tongue 642 are spring biased to the locked position. In various embodiments, the first row 516 extends along a rear of the top face of the first container. In various embodiments, the second row 536 is parallel to the first row. In various embodiments, the second row extends along a front of the top face 508 of the first container. In various embodiments, the first container includes a first lid pivotally attached to the first container, and a first locking latch configured to latch the first lid of the first container in a closed position.

In various embodiments, the first coupling surface 514, the second coupling surface 524, the third coupling surface 534, and the fourth coupling surface 544 are all continuous each other. In various embodiments, at least two of the first coupling surface 514, the second coupling surface 524, the third coupling surface 534, and the fourth coupling surface 544 are continuous each other.

Figure 37:
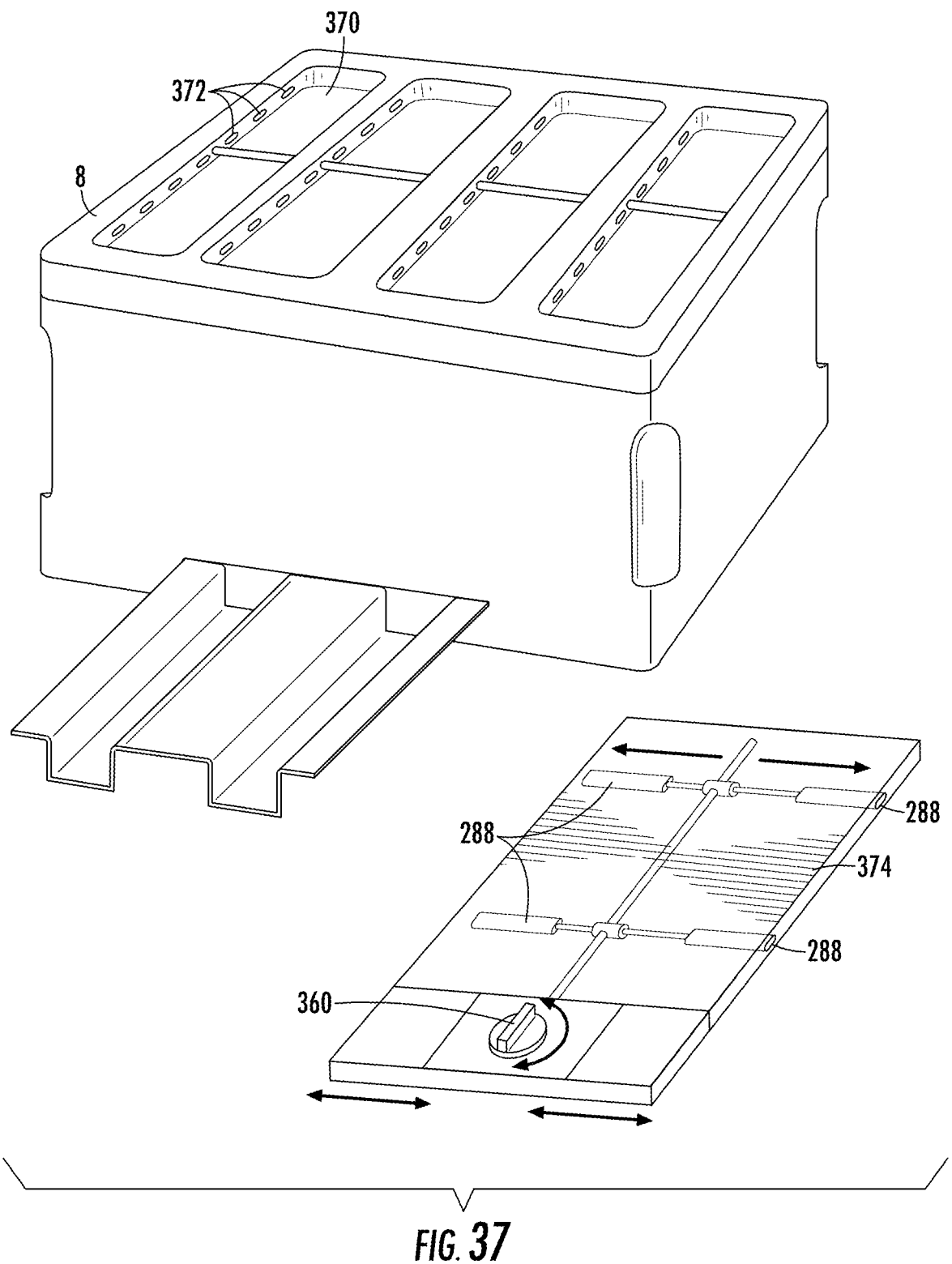
FIG. 37 is several perspective views of a coupling system for a storage unit, according to an exemplary embodiment.

FIG. 37 depicts another embodiment of retractable extensions 288. Top storage container 374 comprises knob 360, which is spring-biased to extend retractable extensions 288. To retract retractable extensions 288, knob 360 is rotated against the spring-bias. In practice, top storage container 374 is coupled to a bottom surface of storage container 8, and knob 360 is rotated to retract retractable extensions 288 and retractable extensions 288 are placed within receptacle 370. Knob 360 is released allowing the spring-loaded bias to extend retractable extensions 288 into apertures 372. It is contemplated herein that retractable extensions 288 are parallel to each other (e.g., FIG. 37). It is also contemplated herein that retractable extensions 288 are angled with respect to each other (e.g., perpendicular).

Figure 38:
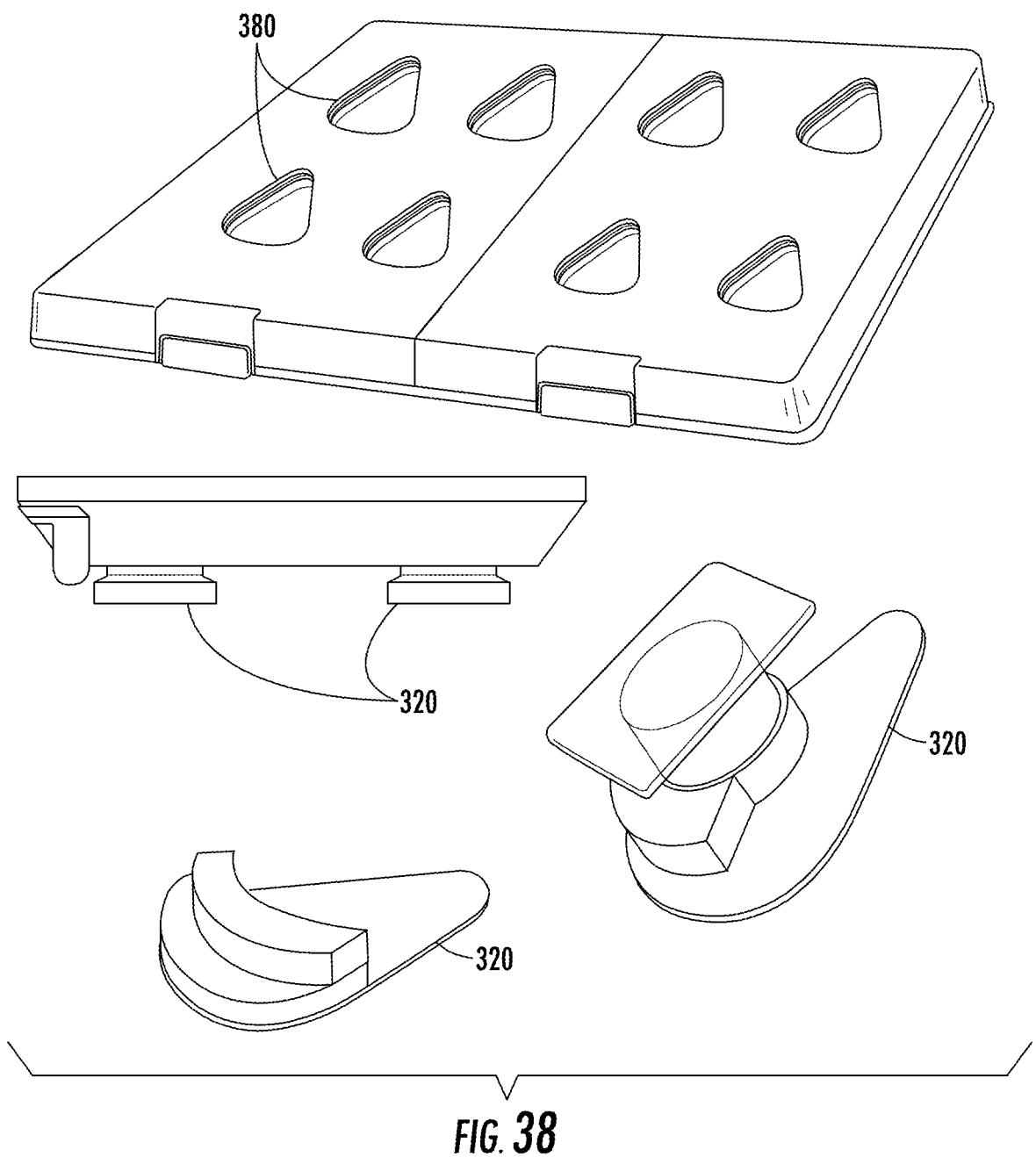
FIG. 38 is several views of a coupling system for a storage unit, according to an exemplary embodiment.

FIG. 38 depicts another embodiment of male cleat 320 in which male cleats 320 engage with receptacle 380. Receptacle 380 comprises an overhang (similar to FIGS. 9-12) that male cleats 320 engage within.

Figure 39:
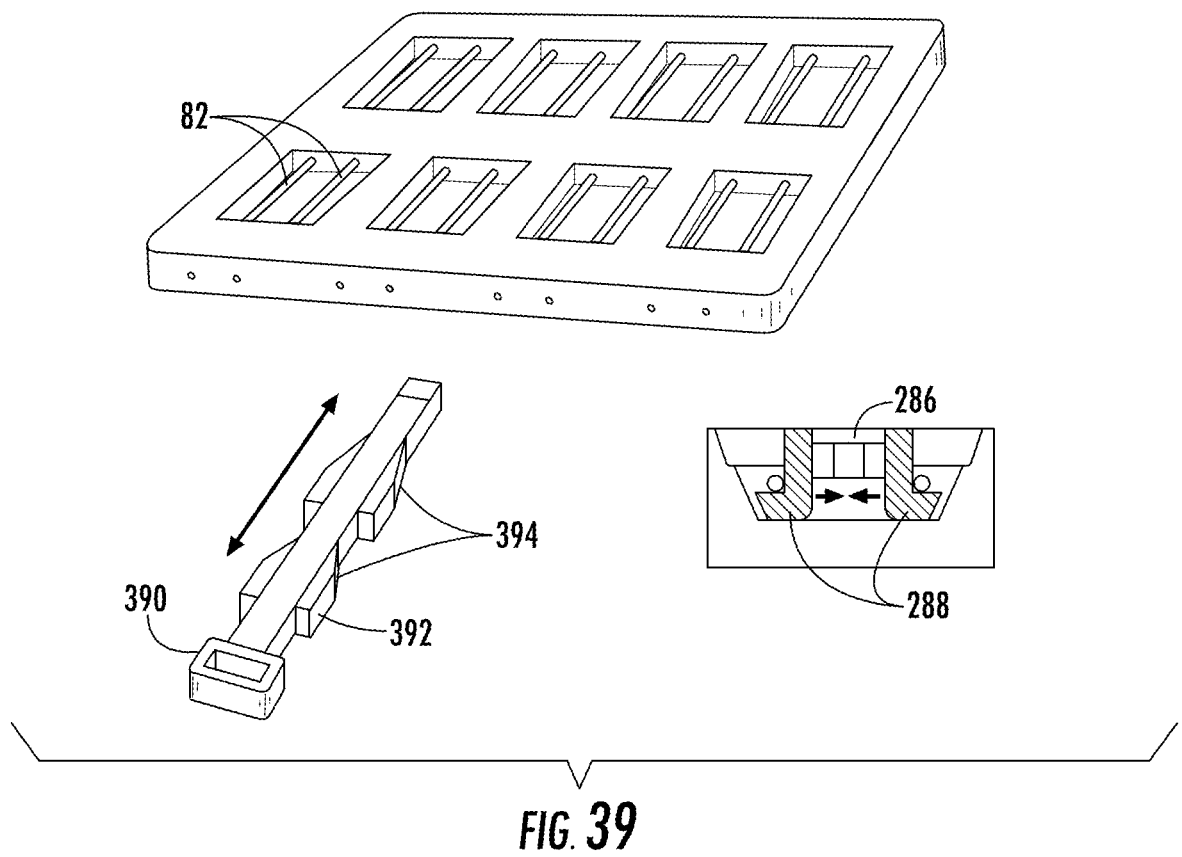
FIG. 39 is several views of a coupling system for a storage unit, according to an exemplary embodiment.

FIG. 39 depicts another embodiment of retractable cleat 286 that engages rails 82. Locking button 390 is spring-biased so that retractable extensions 288 are fully laterally extended when locking button 390 is not engaged. When engaged, diagonal face 394 of protrusions 392 case retractable extensions 288 to be laterally retracted (best shown in bottom-right figure of FIG. 39). In the embodiment of locking button 390 depicted in 390, two sets of protrusions with two sets of diagonal faces interface with two sets of retractable cleats 286.

Figure 40:
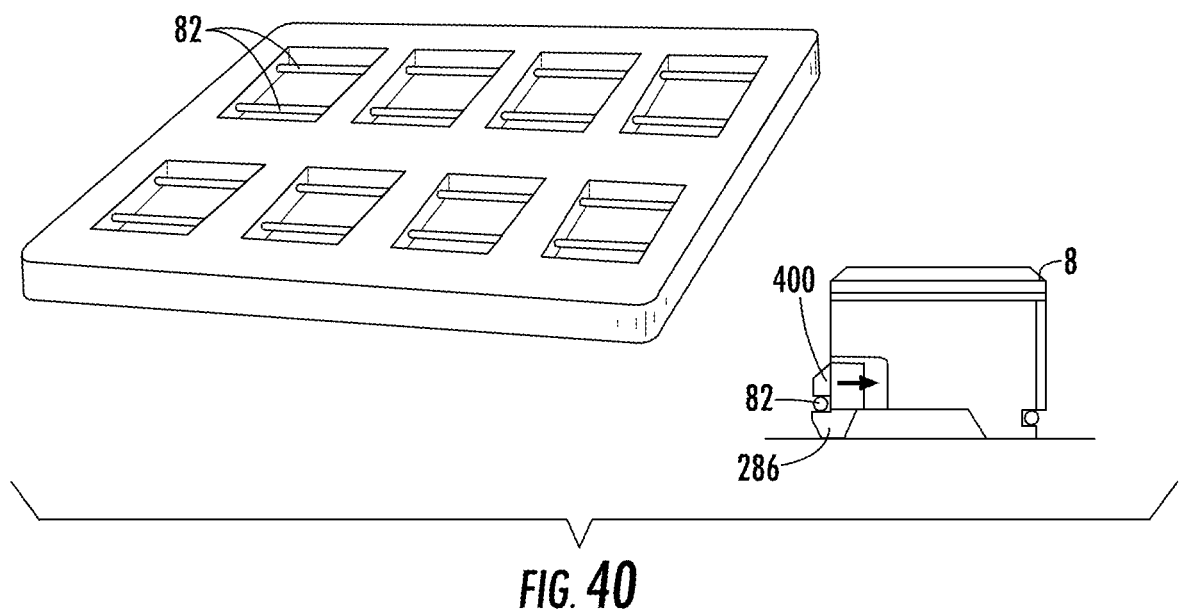
FIG. 40 is several views of a coupling system for a storage unit, according to an exemplary embodiment.

FIG. 40 depicts another embodiment of retractable cleat 286. Engaging locking button 400 laterally moves locking button 400 and retractable cleat 286 into storage container 8, thus disengaging retractable cleat 286 from rail 82. Locking button 400 is spring-biased to default to the extended position (best shown in bottom-right figure in FIG. 40).

Figure 41:
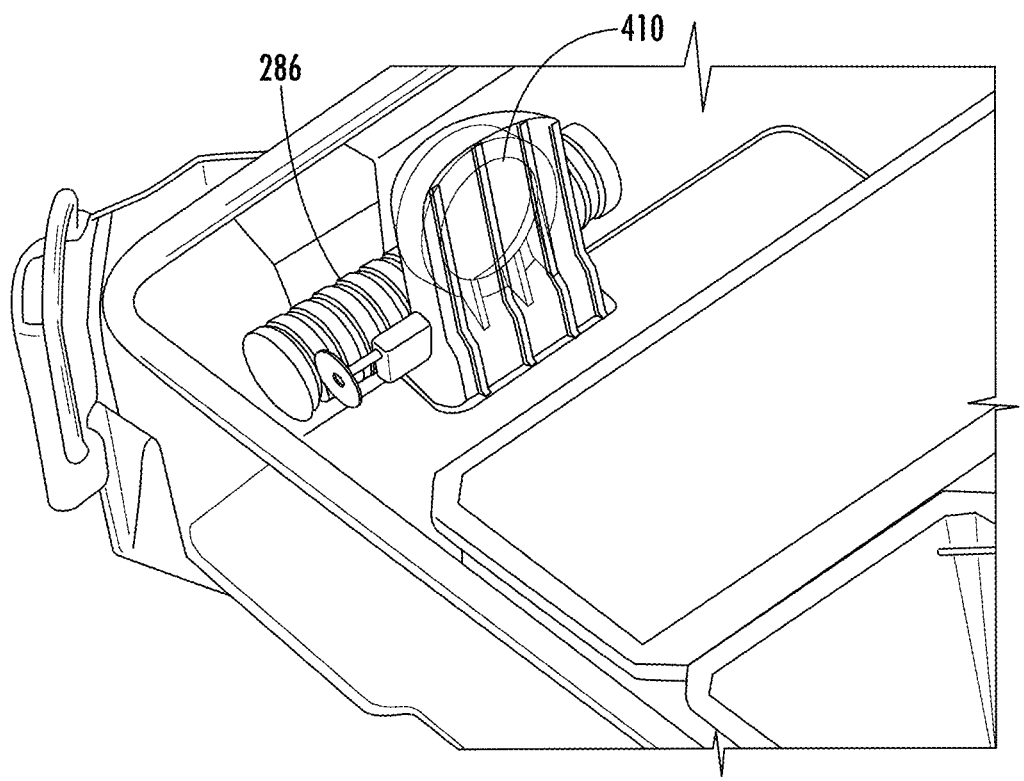
FIG. 41 is a perspective view of a coupling system of a storage unit, according to an exemplary embodiment.

FIG. 41 illustrates a front latch for a tool storage container that can be secured in the locked or unlocked position with a ball detent (as opposed to being spring loaded).

FIG. 41 depicts ball-detent 410 biasing retractable cleat 286. It is contemplated that ball-detent 410 may be used rather than a spring with any of the embodiments described herein.

Figure 42:
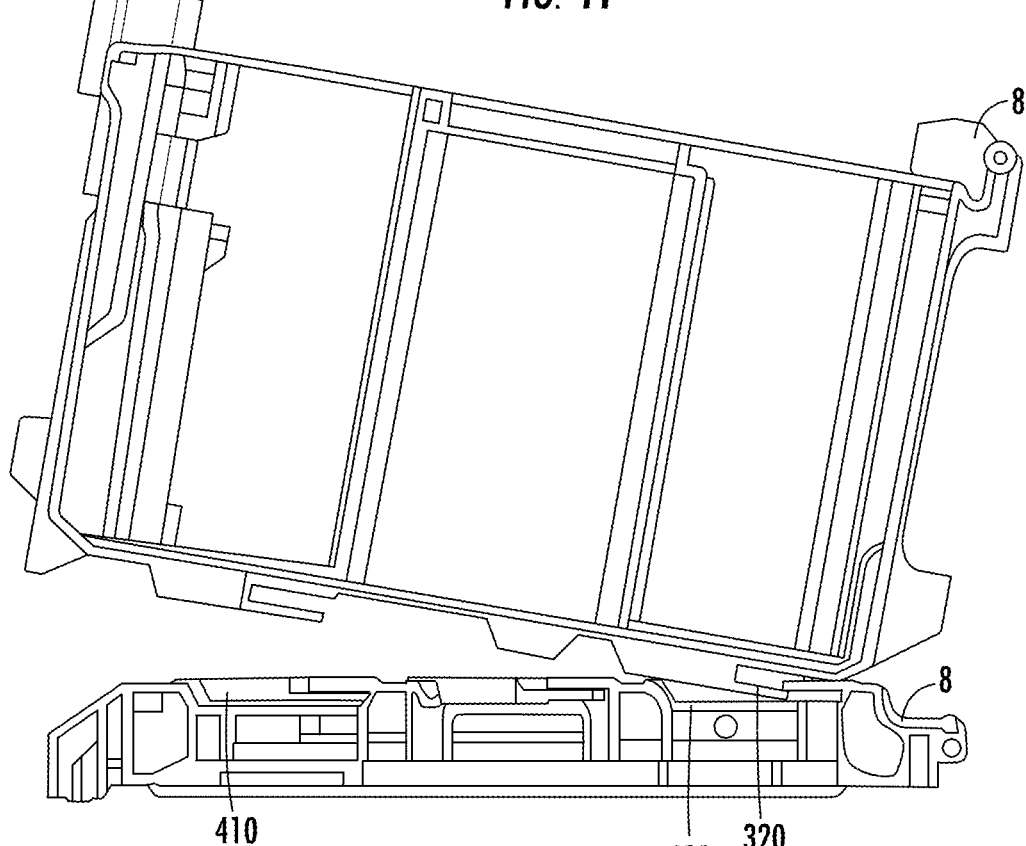
FIG. 42 is a side view of a coupling system of a storage unit, according to an exemplary embodiment.
Figure 43:
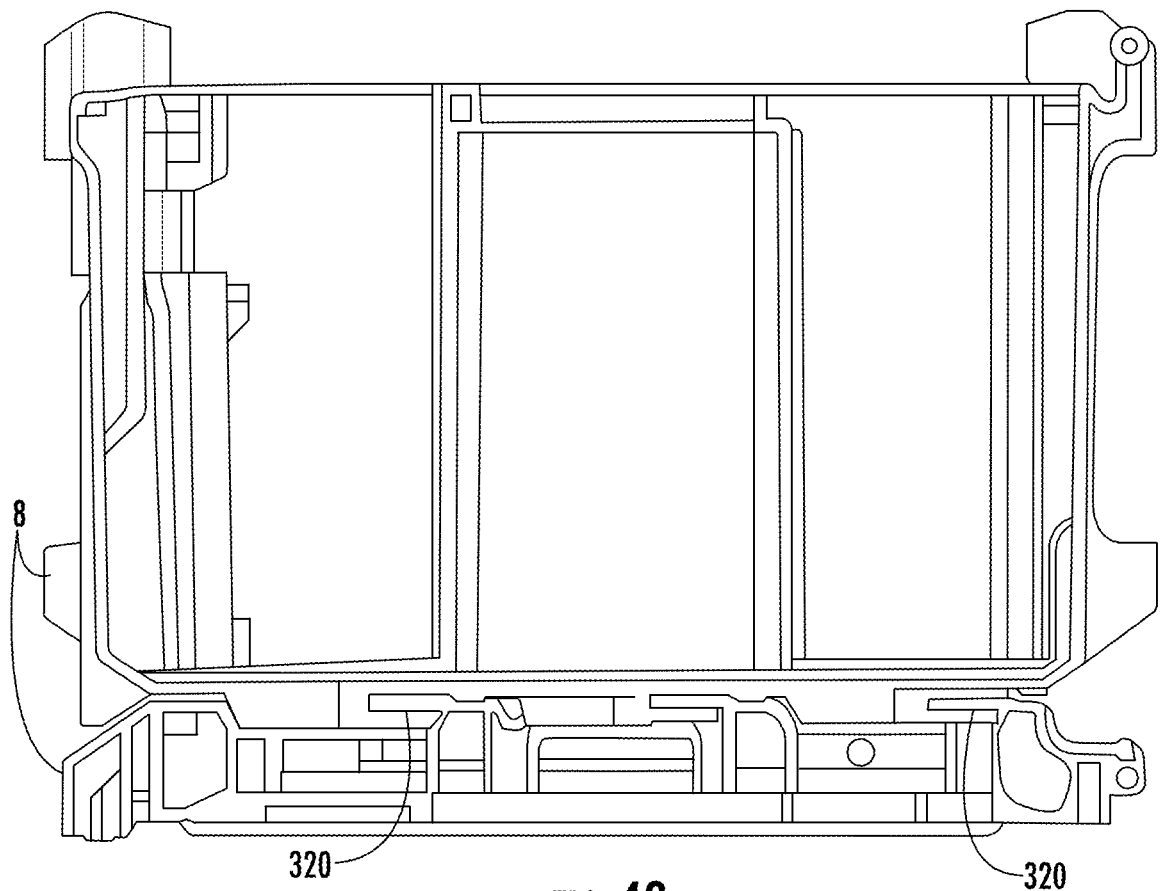
FIG. 43 is a side view of a coupling system of a storage unit, according to an exemplary embodiment.

FIGS. 42-43 illustrate an alternative embodiment where the back cleat includes a rib that slides into a female receptacle.

Figure 44:
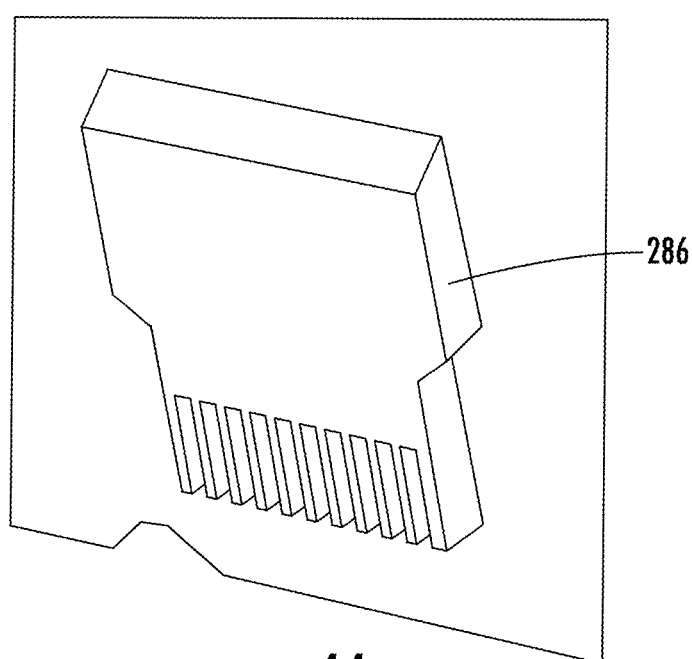
FIG. 44 is a perspective view of a male component of the coupling system of FIG. 43, according to an exemplary embodiment.

In FIGS. 42-43, male cleats 320 are slid into receptacles 420 as top storage container 8 is pivoted and slid towards bottom storage container 8. FIG. 44 depicts an alternative embodiment of retractable cleat 286.

Figure 45:
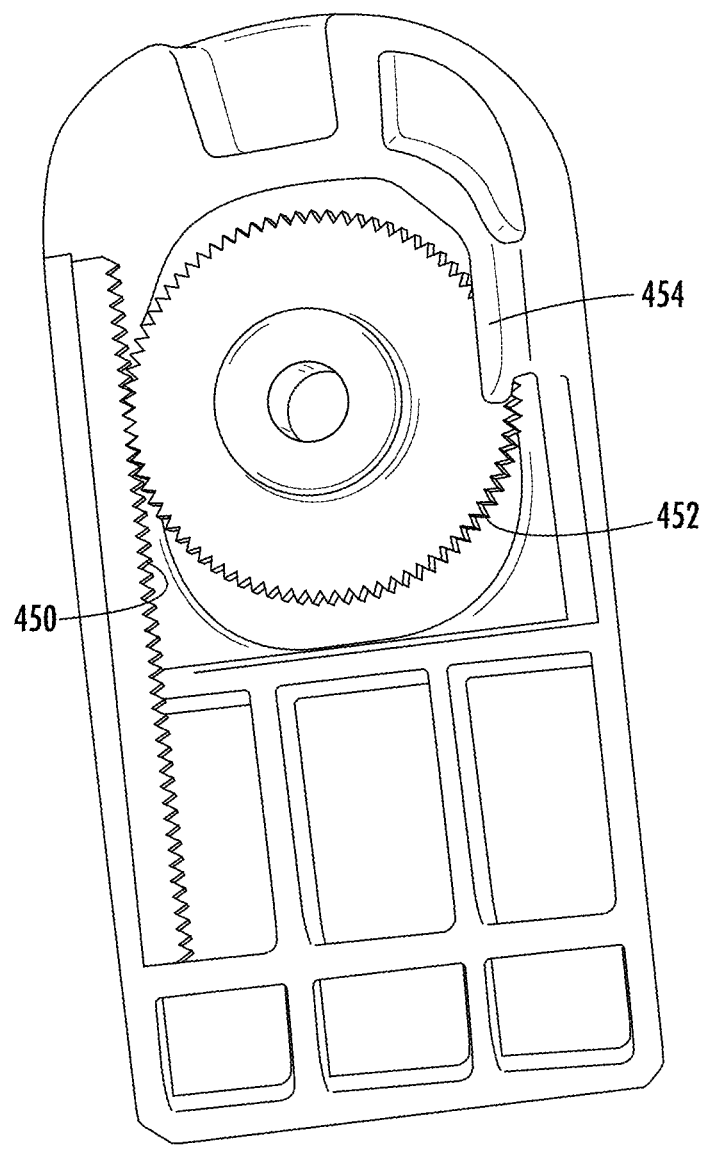
FIG. 45 is a perspective view of a coupling system of a storage unit, according to an exemplary embodiment.

FIG. 45 illustrates a ratcheting front latch for a tool storage container, as opposed to being spring loaded.

In FIG. 45, axle 452 engages with rack 450 to bias retractable cleat 286 into an engaging position with cleat 14 (not shown). As axle 452 is rotated, arm 454 is biased towards and away from rack 450. Arm 454 interfaces with retractable cleat 286 to engage and retract retractable extension 288 in retractable cleat 286.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

We claim:

1. A container assembly comprising:
a first container comprising:
a first rear female coupler configured at a top face of the first container, the first rear female coupler comprising a first rib extending above a first coupling surface;
a second rear female coupler configured at the top face of the first container, the second rear female coupler comprising a second rib extending above a second coupling surface, wherein the first rear female coupler and the second rear female coupler are arranged in a first row along the top face of the first container;
a first front female coupler configured at the top face of the first container, the first front female coupler comprising a third rib extending above a third coupling surface; and
a second front female coupler configured at the top face of the first container, the second front female coupler comprising a fourth rib extending above a fourth coupling surface, wherein the first front female coupler and the second front female coupler are arranged in a second row closer to a front of the first container than the first row;
a second container comprising:
a first rear male coupler extending from the second container, the first rear male coupler comprising a first tongue engageable with the first rib such that the first tongue engages between the first rib and the first coupling surface, wherein attaching engagement between the second container and the first container takes place when the first tongue and the first rib are engaged, thereby restricting separation between the second container and the first container;
a second rear male coupler extending from the second container, the second rear male coupler comprising a second tongue engageable with the second rib such that the second tongue engages between the second rib and the second coupling surface, wherein attaching engagement between the second container and the first container takes place when the second tongue and the second rib are engaged, thereby restricting separation between the second container and the first container;
a first front male coupler extending from the second container, the first front male coupler comprising a first retractable tongue engageable with the third rib such that the first retractable tongue engages between the third rib and the third coupling surface, the first retractable tongue actuating between a locked position and an unlocked position, wherein attaching engagement between the second container and the first container takes place when the first retractable tongue and the third rib are engaged when the first retractable tongue is in the locked position thereby restricting separation between the second container and the first container; and
    a second front male coupler extending from the second container, the second front male coupler comprising a second retractable tongue engageable with the fourth rib such that the second retractable tongue engages between the fourth rib and the fourth coupling surface, the second retractable tongue actuating between a locked position and an unlocked position, wherein attaching engagement between the second container and the first container takes place when the second retractable tongue and the fourth rib are engaged when the second retractable tongue is in the locked position thereby restricting separation between the second container and the first container;
wherein disengaging the second container from the first container can be performed after actuating each of the first retractable tongue and the second retractable tongue to the unlocked position.

2. The container assembly of claim 1, wherein each of the first retractable tongue and the second retractable tongue are spring biased to the locked position.

3. The container assembly of claim 1, wherein actuating the first retractable tongue from the locked position to the unlocked position involves a portion of the first front male coupler rotating with respect to the second container.

4. The container assembly of claim 3, wherein actuating the second retractable tongue from the locked position to the unlocked position involves a portion of the second front male coupler rotating with respect to the second container.

5. The container assembly of claim 1, wherein the first retractable tongue defines a first upper surface that interfaces against a first bottom surface of the third rib to restrict separation between the second container and the first container when the first retractable tongue and the third rib are engaged.

6. The container assembly of claim 5, wherein the second retractable tongue defines a second upper surface that interfaces against a second bottom surface of the fourth rib to restrict separation between the second container and the first container when the second retractable tongue and the fourth rib are engaged.

7. The container assembly of claim 6, wherein the first tongue of the first rear male coupler is rigidly coupled to the second container, and wherein the second tongue of the second rear male coupler is rigidly coupled to the second container.

8. The container assembly of claim 1, wherein the first tongue of the first rear male coupler is rigidly coupled to the second container, and wherein the second tongue of the second rear male coupler is rigidly coupled to the second container.

9. The container assembly of claim 1, wherein the first row extends along a rear of the top face of the first container.

10. The container assembly of claim 9, wherein the second row is parallel to the first row.

11. The container assembly of claim 1, wherein the second row is parallel to the first row.

12. The container assembly of claim 1, wherein the second row extends along a front of the top face of the first container.

13. The container assembly of claim 1, the first container comprising:
    a first lid pivotally attached to the first container; and
    a first locking latch configured to latch the first lid of the first container in a closed position.

14. The container assembly of claim 1, wherein the first coupling surface, the second coupling surface, the third coupling surface, and the fourth coupling surface are all continuous with each other.

15. The container assembly of claim 1, wherein at least two of the first coupling surface, the second coupling surface, the third coupling surface, and the fourth coupling surface are continuous with each other.

\* \* \* \* \*